(12) United States Patent
MacKouse

(10) Patent No.: US 8,660,950 B2
(45) Date of Patent: Feb. 25, 2014

(54) SYSTEM AND METHOD FOR BILL PAY WITH CREDIT CARD FUNDING

(75) Inventor: Jack MacKouse, Walnut Creek, CA (US)

(73) Assignee: Wells Fargo, N.A., San Francisco, CA (US)

( * ) Notice: Subject to any disclaimer, the term of this patent is extended or adjusted under 35 U.S.C. 154(b) by 1249 days.

(21) Appl. No.: 11/104,959

(22) Filed: Apr. 12, 2005

(65) Prior Publication Data

US 2005/0234820 A1 Oct. 20, 2005

Related U.S. Application Data

(60) Provisional application No. 60/562,854, filed on Apr. 16, 2004.

(51) Int. Cl.
*G06Q 40/00* (2012.01)

(52) U.S. Cl.
USPC .................................. 705/41; 705/39; 705/40

(58) Field of Classification Search
USPC ......................................... 705/39, 40, 41, 66
See application file for complete search history.

(56) References Cited

U.S. PATENT DOCUMENTS

| | | | |
|---|---|---|---|
| 5,920,847 | A | 7/1999 | Kolling et al. |
| 6,044,362 | A | 3/2000 | Neely |
| 6,173,269 | B1 | 1/2001 | Solokol et al. |
| 6,341,353 | B1 | 1/2002 | Herman et al. |
| 6,609,113 | B1 | 8/2003 | O'Leary et al. |
| 2001/0037295 | A1 | 11/2001 | Olsen |
| 2002/0004772 | A1 | 1/2002 | Templeton et al. |
| 2002/0023055 | A1 | 2/2002 | Antognini et al. |
| 2002/0055907 | A1 | 5/2002 | Pater et al. |
| 2002/0069112 | A1 | 6/2002 | Abdelhadi et al. |
| 2002/0087465 | A1 | 7/2002 | Ganesan et al. |
| 2002/0087469 | A1 | 7/2002 | Ganesan et al. |
| 2002/0116331 | A1 | 8/2002 | Cataline et al. |

(Continued)

FOREIGN PATENT DOCUMENTS

| | | |
|---|---|---|
| EP | 1 229 480 | 8/2002 |
| WO | 00/67177 | 11/2000 |

(Continued)

OTHER PUBLICATIONS

"CheckFree's Moves Looking Like P2P Play." American Banker. Mar. 12, 2004.

(Continued)

*Primary Examiner* — Samica L Norman
(74) *Attorney, Agent, or Firm* — Foley & Lardner LLP

(57) ABSTRACT

An Internet based bill payment system and method is provided that allows a consumer to push payments and/or information to any payee from the consumer's credit card account. One embodiment of the invention allows the customer to make a payment to any payee from an enterprise credit card or any other credit account of the enterprise, referred to as "Bill Pay advance." One embodiment of the invention is provided which allows an enterprise's consumer credit card customers to sign up for and use the enterprise's bill pay advance system, whether or not the consumer has a demand deposit account (DDA) account. The invention allows the customer to designate either source of funds for payment and for any payee they choose to pay. One embodiment of the invention offers an interchange push methodology with customer choice of the payment source of funds and intelligent routing.

20 Claims, 11 Drawing Sheets

(56) References Cited

U.S. PATENT DOCUMENTS

| | | | |
|---|---|---|---|
| 2002/0138428 A1* | 9/2002 | Spear | 705/41 |
| 2003/0055756 A1 | 3/2003 | Allan | |
| 2003/0055769 A1 | 3/2003 | RuDusky | |
| 2003/0061170 A1 | 3/2003 | Uzo | |
| 2003/0069842 A1 | 4/2003 | Kight et al. | |
| 2003/0105672 A1 | 6/2003 | Epstein et al. | |
| 2003/0105710 A1* | 6/2003 | Barbara et al. | 705/39 |
| 2003/0115126 A1 | 6/2003 | Pitroda | |
| 2003/0140004 A1 | 7/2003 | O'Leary et al. | |
| 2003/0195846 A1 | 10/2003 | Felger | |
| 2003/0195848 A1 | 10/2003 | Felger | |
| 2003/0208445 A1 | 11/2003 | Compiano | |
| 2003/0216990 A1 | 11/2003 | Star | |
| 2004/0015438 A1 | 1/2004 | Compiano et al. | |
| 2004/0019560 A1 | 1/2004 | Evans et al. | |
| 2004/0034596 A1 | 2/2004 | Light et al. | |
| 2004/0039692 A1 | 2/2004 | Shields et al. | |
| 2004/0049455 A1 | 3/2004 | Mohsenzadeh | |
| 2004/0049456 A1 | 3/2004 | Dreyer | |
| 2012/0136795 A1* | 5/2012 | Hoffman et al. | 705/66 |

FOREIGN PATENT DOCUMENTS

| | | |
|---|---|---|
| WO | 01/41527 | 6/2001 |
| WO | 02/05224 | 1/2002 |
| WO | 02/05231 | 1/2002 |
| WO | 02/35429 | 5/2002 |
| WO | 02/069092 | 9/2002 |

OTHER PUBLICATIONS

"The Rush to Fill c2it's Void". Bank Technology News. Feb. 2004.
"The Tech Scene: eBay CEO on What PayPal is and isn't". *American Banker*, Mar. 24, 2004.
Dennis, G. *Electronic Tellers will Change conventional Images*. Data Management.vol. 14. No. 7. Jul. 1976.
Essinger, J. *Halifax Building Society Joins Link ATM Network*. Electronic Banking & Finance. vol. 5, No. 9. Nov. 1988. Netherlands.
Gotylieb, L. *The Voice on the Telephone has a Message for IT*. CMA, vol. 67. No. 3. Apr. 1993. Canada.
Graeber, C. "Why Consumer Prefer Biller Sites to Pay Bills". *WholeView Technographics Research*. Sep. 4, 2003.
Harler, C. *First Hawaiian IVR Integrates Voice and Data*. Communication News. vol. 31. No. 3. Mar. 1994.
http://onlinebankingreport.com. Lessons from the Card Marketers. No. 104. Feb. 13, 2004.
http://www.bankofamerica.com/index.cfm?page=corp_bofacom. Sign up for Online Banking with Free Bill Pay.
http://www.discovercard.com. Account Center, Automatic Bill Payment.
http://www.paypal.com/cgi-bin/webscr?cmd=p/ema/index-outside. See Demo.
http://www.paypal.com/chi-bin/webser?cmd=_home. Start Accepting Credit Cards Today.
https://paydirect.yahoo.com/PD/ui/us/fp/homeOverview-ui.pd?prsID=. Yahoo PayDirect for HSBC.
MBNA America. Bill Pay Choice.
Orenstein, A. *Arkansas Bank's Site Extends Market Research*. Bank Systems Technology. vol. 34. No. 10. Oct. 1997.
Sirbu, M. *Internet Billing Service Design and Prototype Implementation*. CMU's Master of Science Program in Information Networking.
*Visa Business Review*. Issue No. 040120. Jan. 2004.
Non-Final Office Action on U.S. Appl. No. 13/620,581, mail date Jun. 17, 2013, 9 pages.

\* cited by examiner

☒ Use Phase 2.1 above screen transaction limit error message. Substitute "$50,000" with "$10,000" for consumer credit card funded payments

Make Payment

Make Payment To
AAA FINANCIAL - xxxxxx1234

Payment Account
[xxxxxxxxxx1234 VISA ▼]

Payment Amount
☒ [$21,000.00]

Payment Date
[3/29/2004]

Memo information/Invoice #
[                ]

Category
[None ▼]

[Continue]

Please allow at least 3(5) business days after your scheduled payment to ensure on-time payment. For payments funded by a checking account, if you do not have sufficient funds on the scheduled payment date, we may make the payment using available Overdraft Protection funds or create an overdraft (which is subject to fees). Ask us about Overdraft Protection options.

*FIG. 6*

☒ Use Phase 2.1 above screen transaction limit error message. Substitute "$50,000" with "$10,000" for consumer credit card funded payments

Pending Payments | Edit Payment

Make Payment To
AAA FINANCIAL - xxxxxx1234

Payment Account
[xxxxxxxxxxx1234 VISA ▼]

Payment Amount
☒ [$21,000.00]

Payment Date
[1/28/2004]

Memo information/Invoice #
[                    ]

Category
[Business: Rental and Lease ▼]

Please allow at least 3 business days to ensure on-time payment.

[> Submit]

FIG. 7

Bill Pay

- Status Update
- View eBills
- Payment Activity
- Manage Payees

Make Payment
Pending Payments
Add Payee

Create Reports
May Profile
View Notice

Status Update                                                                 How Do I...

The following activity has occurred since last visit.
10/25/2004 08:55 a.m. (Pacific Time)

0 New eBills                0 New Payments Sent          0 New Pending Payments         0 New Notices

[View All eBills]           [View All Payments]          [View All Pending Payments]    [View All Notices]

Financial Accounts

| Payment Account | Available Balance |
|---|---|
| 123-4567xxx Checking | $2,992.61 |
| 234-567 Bxxx Bill's Checking | $6,332.95 |

| Payment Account | Available Balance |
|---|---|
| xxxxxxxxxxx1234 VISA | $5,606.12 |

*FIG. 8*

Bill Pay Advance (Three-in-one-Version)

Text TBD

You have selected a credit account to fund a Bill Pay payment. The fees for this transaction are:

| | Transaction Fee | Grace Period | Interest Rate | Daily Limit |
|---|---|---|---|---|
| Consumer Credit Card | 2% | None | Purchase Rate | $10,000 |
| Business Credit Card | 3% ($10 min, $75 max) | None | Cash Advance Rate | $10,000 |
| BusinessLine℠ | None | None | Cash Advance Rate | $50,000 |

* There is a daily limit for credit account funded Bill Payments. We will attempt to process your scheduled payment(s) in the following order in highest to lowest dollar amount within: previous night rejected payments, automatic payments, one-time payments. Payments that exceed the credit account daily limit will be retried the next business day and if rejected will be canceled and you will be notified by e-mail alert and Bill Pay notice.

⦿ I accept
○ I do not accept, edit funding account now

SYSTEM AND METHOD FOR BILL PAY WITH CREDIT CARD FUNDING

CROSS-REFERENCE TO RELATED APPLICATIONS

This application claims priority to U.S. Provisional Patent Application Ser. No. 60/562,854, filed Apr. 16, 2004, which application is incorporated herein in its entirety by the reference thereto.

BACKGROUND OF THE INVENTION

1. Technical Field

The invention relates generally to bill payment systems. More particularly, the invention relates to a Internet based bill payment system allowing a consumer to push payment to a payee, such as a merchant, from the consumer's credit card account, regardless of whether or not the payee accepts credit card payments.

2. Description of the Prior Art

Current online bill payment systems such as, for example, Wells Fargo's Bill Pay service, allow a customer to make a bill payment to a payee where the bill payment is funded from a designated demand deposit account (DDA) at the financial institution where the customer has an account. This is referred to herein as the bill pay method. Regarding credit card payments, it is known that a payee that accepts credit card payments is required to pay a charge to the payee's acquiring bank (acquirer) to settle payment received via an accepted credit card payment by way of a card association network and association's set of rules. This results in a portion of the charge paid by the payee to the acquirer being passed back to the customer's credit card issuing bank (issuer) with such payment to the issuer being known as interchange. This is referred to herein as the interchange method.

One current methodology for completing such type of bill payment transaction includes a consumer periodically transferring money to the consumer's DDA account via a variety of ways. For example, the consumer can transfer money using an online transfer to the DDA, the consumer can deposit a credit card access check to the DDA account, and the consumer can take a cash advance and then deposit such advance to the DDA. In each of these scenarios, the consumer is typically charged an advance fee and a higher advance rate APR, as opposed to a purchase rate. Also, the consumer needs to make sure that the amount transferred is at least equal to or in excess of the sum of all payments to be made. Such current process is unwieldy and likely to be expensive for the consumer.

Another example of a bill payment transaction is a PayPal-type transaction and has disadvantages. According to this solution, a middleman company is set up as a merchant to expedite payments from one party to another. For example, PayPal accepts funds from a payor and then sends an email to the payee letting the payee know that funds have been deposited at PayPal. In order to receive the funds the payee must either open an account with PayPal to receive an electronic payment or contact PayPal to alternatively have a check issued to them. Payees must also pay a fee to receive payments if the source of the funds is a credit card account. The payee must have an email address. PayPal, as a merchant, charges the payee and/or the payor a fee to cover such interchange costs.

An example of an online transfer function as a source of funds is one offered by Wells Fargo. Such function allows a Wells Fargo customer to transfer money online from the customer's Wells Fargo credit card account to that same customer's DDA account. The transfer is treated as a cash advance, which can be costly for the customer and if the funds are to be used to make payments from Well Fargo's Bill Pay system, the transfer needs to be in excess of the sum of all payments to be made.

It would be advantageous to allow an enterprise to offer enterprise online bill payment customers the option to choose an enterprise consumer credit card account, business credit card account, or other credit product as a source for funding to make a payment in addition to or separate from the option to use a DDA or other deposit account as a source of funds. It would be further advantageous to create an Internet based bill payment system which allows a consumer to use an advance methodology that pushes payments, which can be a combination of specific amounts for each payment, to payees whether or not the payee accepts credit card payments. It would be further advantageous for a consumer to make multiple small advances from the consumer's credit card account in an exact amount of each payment desired. It would be further advantageous to enable an enterprise to offer a bill payment advance methodology, i.e. funded by credit account, with a lower or no per-transaction fee and a rate lower than typical advance rate APR's. It would be further advantageous to charge only a purchase rate and a lower or no transaction fees. It would further be advantageous to allow for an interest rate grace period. It would be further advantageous to treat a transaction as an internal advance and not as a payment as if to a merchant. It would be further advantageous to provide a bill pay advance methodology where an issuing bank and an acquiring bank do not have to be the same bank or enterprise and where a card association network settles the issuer and acquirer accounts including requiring interchange fee payments to the issuing bank.

SUMMARY OF THE INVENTION

An Internet based bill payment system and method is provided that allows a consumer to use an advance methodology, which pushes payments and/or information to any payee from the consumer's credit card account. One embodiment of the invention allows the customer to make a payment to a payee from an enterprise credit card or any other credit account of the enterprise. The pushed payment made is for a specific amount for each payment and is made regardless of whether or not the payee accepts credit card payments. Thus, the consumer can make multiple small advances from the consumer's credit card account in an exact amount of each payment desired. One embodiment of the invention is provided which allows an enterprise's consumer credit card customers to sign up for and use the enterprise's bill pay advance system, whether or not the consumer has a demand deposit account (DDA) account. Another embodiment of the invention is provided where the customer has a DDA to allow among other things the enterprise's DDA department to collect any Bill Pay service fees assessed as well as initially to enable the enterprise to keep risk low by offering the service to relationship customers. The invention allows a customer to pay any payee with an amount of payment and whereby such amount is charged to the customer's consumer credit card account, referred to herein as "Bill Pay advance." If the customer has a DDA account, then invention allows the customer to designate either source of funds for payment and for any payee they choose to pay, referred to herein as a DDA Bill Pay payment.

One embodiment of the invention offers an interchange push methodology with customer choice of the payment source of funds and intelligent routing.

BRIEF DESCRIPTION OF THE DRAWINGS

FIG. 6 is an example of a screen shot showing a credit card chosen for the Payment Account according to the invention;

FIG. 7 is an example of a screen shot showing the Edit Payment tab where the Payment Account selection is a credit card according to the invention;

FIG. 8 is an example of a screen shot showing a Status Update tab wherein the Financial Accounts include checking and credit card accounts according to the invention;

FIG. 10 is an example of a screen shot showing three credit sources for funding a Bill Payment advance and the pricing in effect at the time for each payment source option, including a daily limit on the amount of payments to be scheduled for payment according to the invention.

DETAILED DESCRIPTION OF THE INVENTION

An Internet based bill payment system and method is provided that allows a consumer to use an advance methodology, which pushes payments and/or information to any payee from the consumer's credit card account. One embodiment of the invention allows the customer to make a payment to a payee from an enterprise credit card or any other credit account of the enterprise. The pushed payment made is for a specific amount for each payment and is made regardless of whether or not the payee accepts credit card payments. Thus, the consumer can make multiple small advances from the consumer's credit card account in an exact amount of each payment desired. One embodiment of the invention is provided which allows an enterprise's consumer credit card customers to sign up for and use the enterprise's bill pay advance system, whether or not the consumer has a demand deposit account (DDA) account. Another embodiment of the invention is provided where the customer has a DDA to allow among other things the enterprise's DDA department to collect any Bill Pay service fees assessed as well as initially to enable the enterprise to keep risk low by offering the service to relationship customers. The invention allows a customer to pay any payee with an amount of payment and whereby such amount is charged to the customer's consumer credit card account, referred to herein as "Bill Pay advance." If the customer has a DDA account, then invention allows the customer to designate either source of funds for payment and for any payee they choose to pay, referred to herein as a DDA Bill Pay payment. One embodiment of the invention offers an interchange push methodology with customer choice of the payment source of funds and intelligent routing.

It should be appreciated that the examples set forth herein are meant by way of example only and are not limiting. For example, while a particular discussion herein uses a consumer credit card account, it is well within the spirit and scope of the invention that other types of credit products, such as for example, a business credit card account, can be used as well.

It should further be appreciated that a debit card can also be referred to as a check card or as any vehicle that accesses the funds in the DDA or checking account in the manner described herein.

Figure 1:
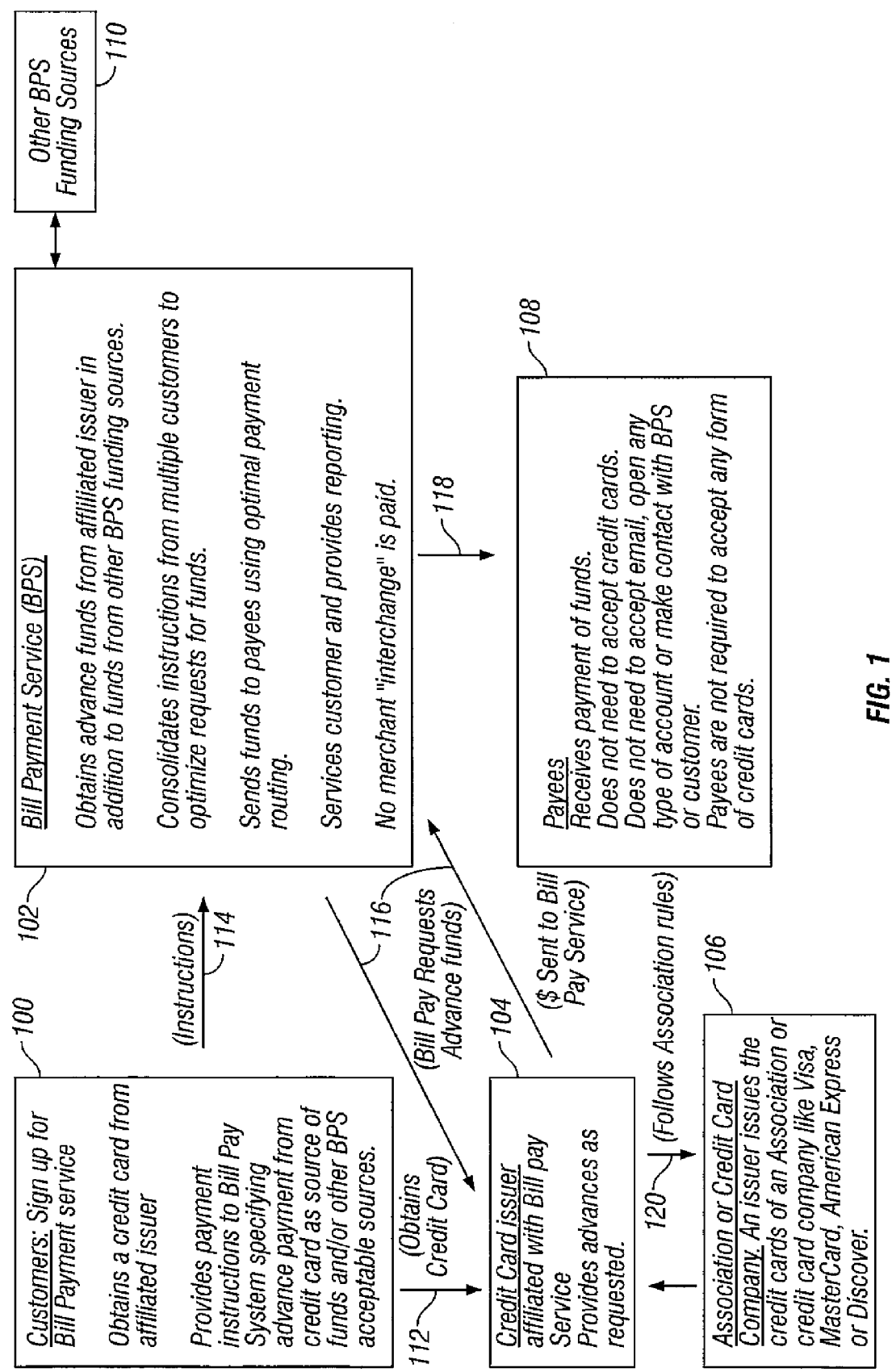
FIG. 1 is a schematic diagram of the entities of the invention and the respective interactions according to the invention.

One embodiment of the invention can be described with reference to FIG. 1, a schematic diagram of main entities of a bill pay advance without interchange transaction and the respective interactions according to one embodiment of the invention. A customer 100 signs up for a Bill Payment service (BPS) 102. The customer then either has or obtains a credit card 112 from an issuer 104 affiliated with the BPS. The customer provides payment instructions 114 to the BPS 102 specifying advance payment from the credit card as a source of funds and/or other BPS acceptable sources 110, such as lines of credit, brokerage, savings, and DDA. The BPS 102 then obtains the advance funds 116 from the affiliated issuer 104 in addition to funds from the other BPS funding sources 110. In one embodiment of the invention, the BPS 102 then consolidates instructions from multiple customers to optimize requests for funds, such as for example in batch processing. The BPS then sends the funds 118 to payees 108 using optimal payment routing. The BPS further services the customer, including providing reporting. It should be appreciated that no payee interchange is paid. The payees 108 receive payment of funds 118. It should be appreciated that a payee does not need to accept credit cards of any kind. A payee is not required to accept email, open any type of account, or make contact with either the BPS 102 or customer 100. Further, the payee is not limited to having to be paid by electronically by a third party financial gateway, nor is the payee required to be a member of a particular association. The payee may accept credit cards for some types of transactions, but not accept credit cards as a form of payment for this particular type of transaction. The credit card issuer 104 that is affiliated with the BPS 102 provides advances as requested 116. A credit card issuer 104 is associated as typical with an Association or Credit card company such as Visa, MasterCard, American Express or Discover 106 that creates among other things the rules that issuers and payees, e.g. merchants, must follow to be an issuer or accepter of that Association's credit card products.

Figure 2:
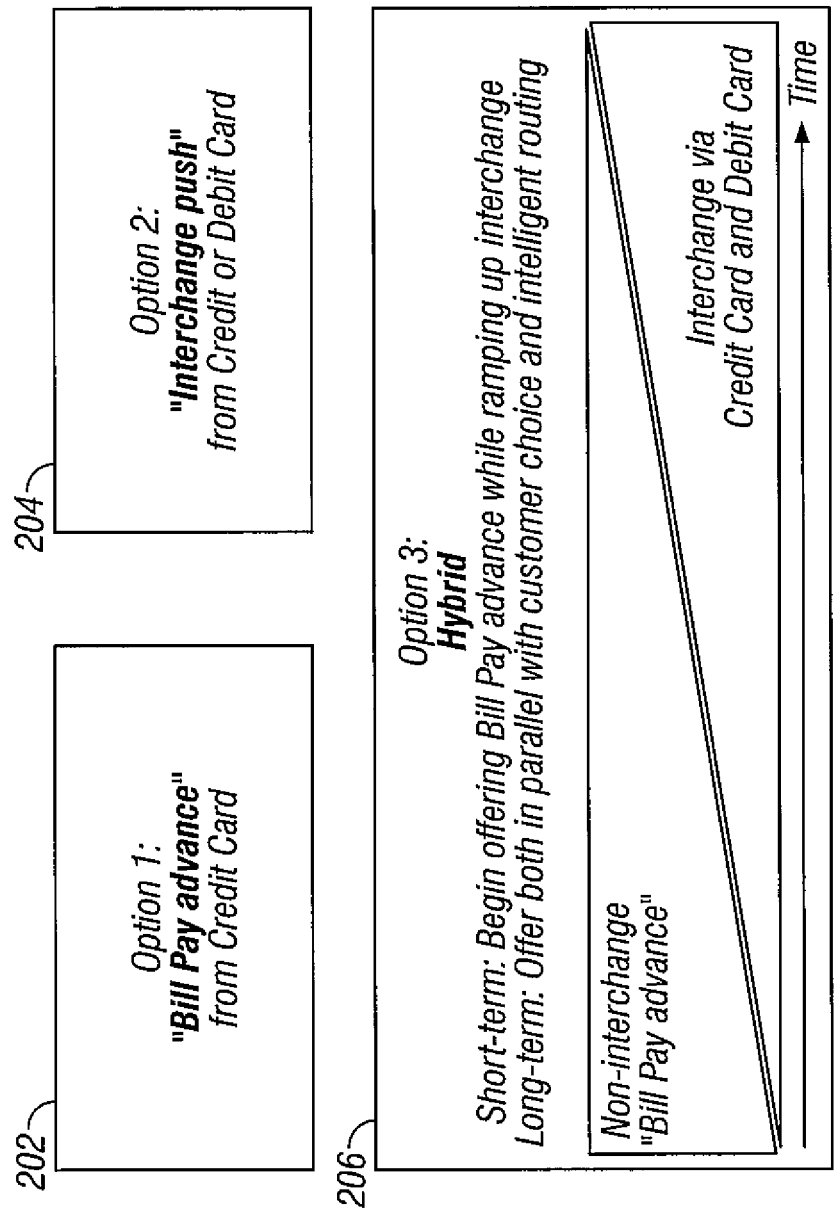
FIG. 2, a schematic diagram of three options offered to a customer according to the invention.

One embodiment of the invention can be described with reference to FIG. 2, a schematic diagram of three options offered to a customer. Option 1 202 offers Bill Pay advance to the customer, whereby the customer is allowed to pay bills from the customer's affiliated credit card account as described in FIG. 1. Option 2 204 offers interchange push to the customer, whereby the customer can choose to make a payment to a payee from the customer's credit card account or debit card account and the transaction-related information is pushed to the payee as an interchange eligible transaction, for the payee to process. Option 3 206 is a hybrid of Option 1 and Option 2. Option 3 offers a both Option 1 and Option 2 in parallel with customer choice and intelligent routing mechanisms.

Regarding pricing, in one embodiment of the invention, current purchasing terms include a grace period, but in another embodiment of the invention, no grace period is allowed. In another embodiment of the invention, there are no per-transaction fees.

Regarding rewards, in one embodiment of the invention, rewards points are used to promote consumer use. In one embodiment of the invention, rewards are not offered for each dollar spent. The implementation can be determined based on the appropriate analysis of the enterprise.

It should be appreciated that with the interchange push methodology, the customer's experience in requesting the payment to be made is the same. The customer's credit card account is debited directly by the issuer with Option #1. There can be a delay in the customer's credit card account being debited in Option #2 because the payee requests payment through the payee's acquirer before the payment amount is debited from the customer's credit card account.

In one embodiment of the invention, the transaction follows the same process currently used in an enterprise online transfer function to move funds out of the enterprise's credit card account. However, instead of directing the transfer of funds to an enterprise DDA, the funds are ultimately directed to the payee designated by the customer. In one embodiment of the invention, interchange money is handled in the same way it is handled for a regular purchase transaction. In another embodiment of the invention, the transaction is an interchange push transaction, where the payee, accepting credit and/or debit cards, accepts as payment a transaction payment from the Bill payment system, in the same way payment is accepted for any other credit and/or debit card purchase. That is, such payment for transaction involves interchange payments to the issuer. See FIG. 5.

Figure 3:
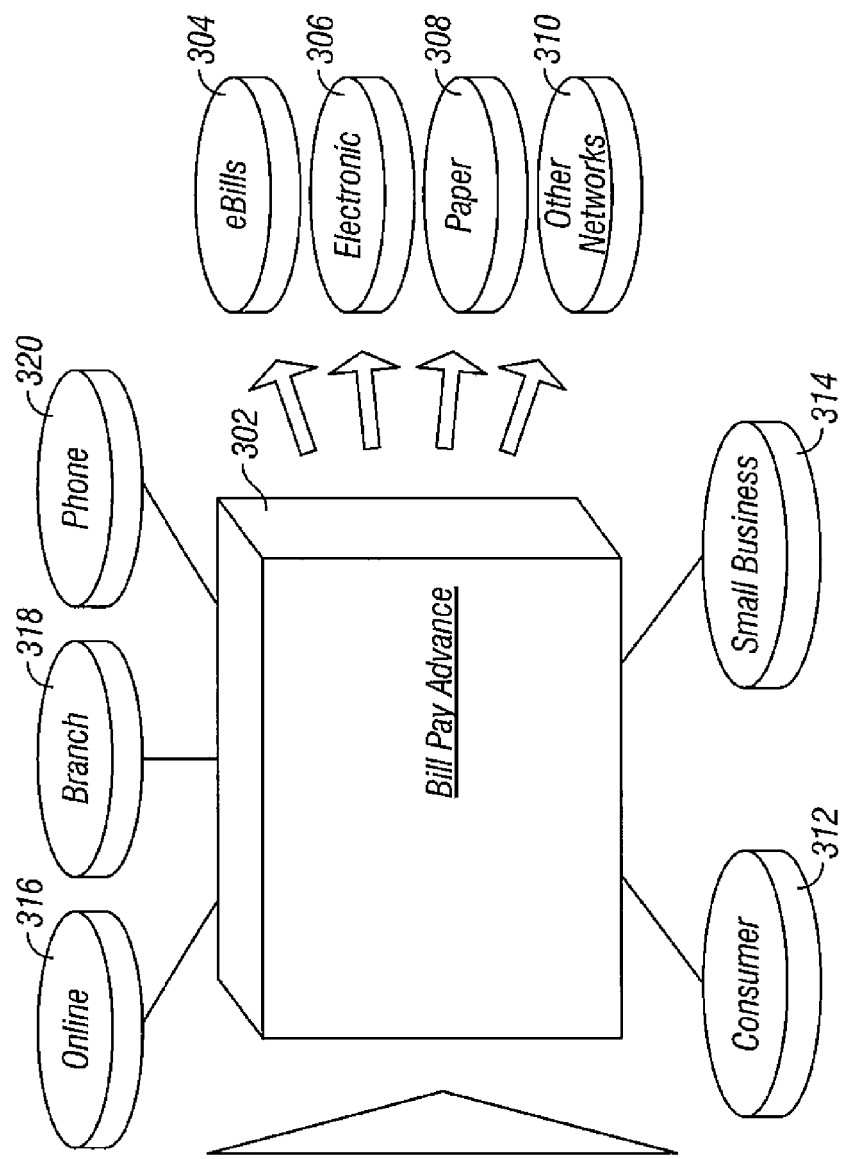
FIG. 3 is a schematic diagram showing main components and the respective relationships of a transaction hub according to the invention.

One embodiment of the invention can be described with reference to FIG. 3, a schematic diagram showing main components and the respective relationships of a transaction hub according to the invention. A Bill Pay advance system 302 of an enterprise provides payments in various formats, such as formats required to pay eBills 304, by other electronic configurations in which the Bill Pay advance system and the payee can effect payments electronically 306, in paper 308 format where typically a paper check is sent to the payee on behalf of the customer, and by other network configurations 310, e.g. where Bill Pay contracts with third parties, such as CheckFree by CheckFree Corporation, to effect payments to the payees. Typical users of the Bill Pay system are consumers 312 and small businesses 314 although other size businesses could be customers as well in the same manner. It should be appreciated that medium and larger businesses could leverage this methodology as well. Typical entry points into the Bill Pay system are online means 316, by branch office means 318, over the phone 320, and the like. Typical funding sources are DDA 322 and savings accounts 324. One embodiment of the invention provides affiliated credit card accounts 326 as a funding source and pushes appropriate funds to the payee. Another embodiment of the invention incorporating the interchange push technique provides credit card accounts 326 and/or debit card accounts 328 as a funding source and pushes information to the payee. Typical information provided is an account number and verifying information such as account expiration date, customer name, etc. Then the payee uses this information to process the transaction through the payee's acquiring bank and pays fees to do so including interchange which ends up with the issuer of the credit or debit card. It should be appreciated that any type of enterprise account, such as line of credit 330 and brokerage 332 can be used as a source of funding.

Figure 4:
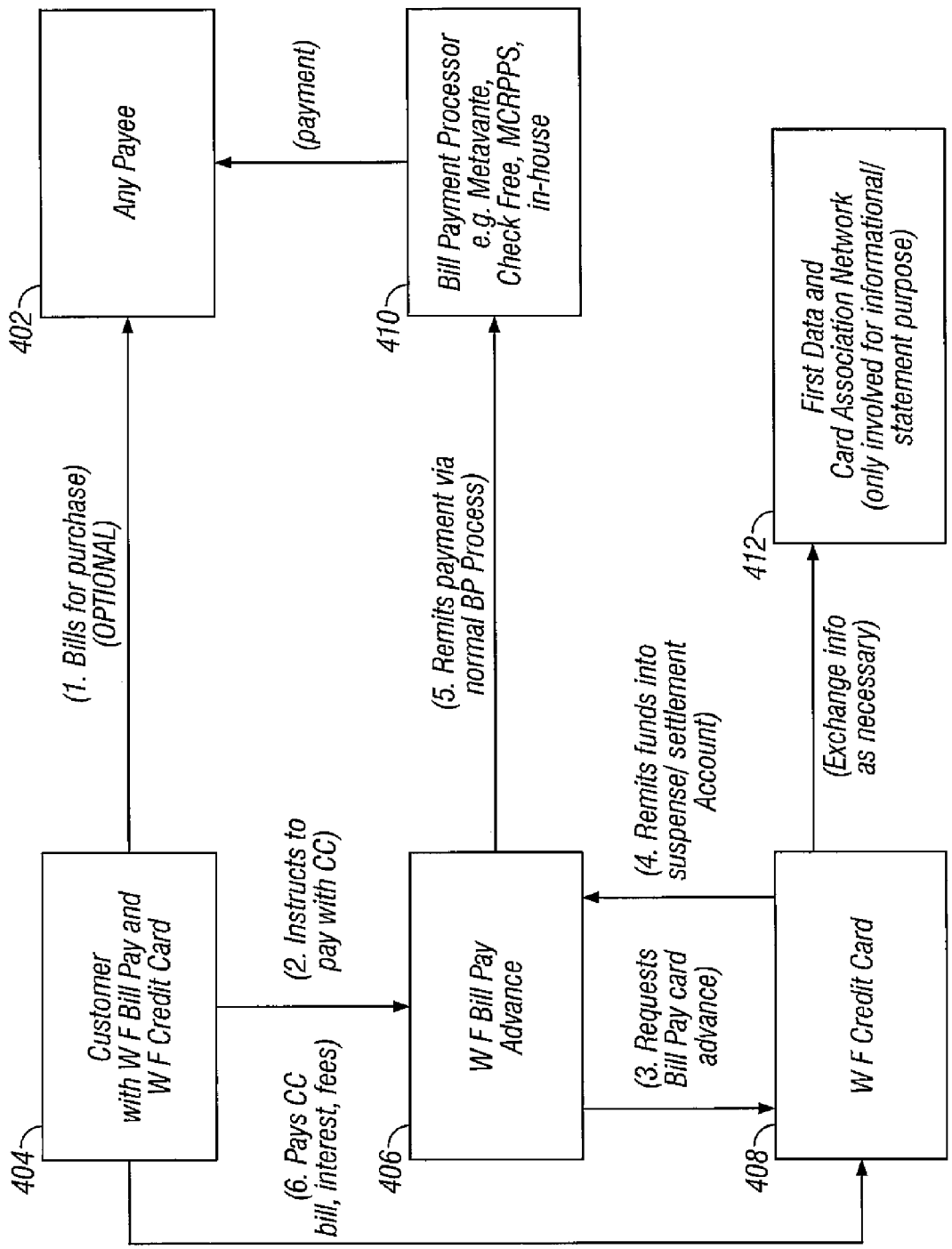
FIG. 4 is a flow diagram of an embodiment of a non-interchange Bill Pay advance methodology according to the invention.

Details of Option 1, Bill Pay advance, can be described with reference to FIG. 4, an example flow diagram of an embodiment of the non-interchange Bill Pay advance methodology according to the invention. A customer 404, having both an account on a Bill Pay advance system and a credit card account, instructs the Bill Pay advance system 406 to make payment to any payee 402 using the customer's credit card. The schedule for payment can be a scheduled one-time payment or a periodic recurring payment and the like. It should be appreciated that a payee could be a merchant, a biller, a neighbor to whom the customer owes payment, a relative, and so on. It should further be appreciated that the accounts are owned and managed by a same enterprise, such as for example, Wells Fargo (WF), which is the example enterprise depicted in FIG. 4. The Bill Pay advance system 406 signals a request to the affiliated credit card processor 408 for a Bill Pay advance. The credit card processor 408 remits an appropriate amount of funds to designated accounts in the Bill Pay advance system 406, such as for example, a suspense account and/or settlement account. Upon receiving the funds, the Bill Pay advance system 406 remits payment by way of a Bill Payment processor 410. The Bill Payment processor 410 remits payment to the payee 402 by way of the normal Bill Payment processing. From the payee's perspective, the payee 402 receives payment as it expects to receive payment and is not necessarily aware that the payment was funded by the payor's affiliated credit card account. It should be appreciated that the credit card system 408 continues to exchange customer credit card information as necessary, such as for informational and statement purposes, with a Card Association Network 412 or other entities that assist with account servicing, as a part of normal business practices. It should further be appreciated that optionally and as depicted in FIG. 4, the payee 402 can provide a bill to the customer 404 (Step 1.) and thereby initiate the process.

Then, at the end of the customer's credit card cycle or at other times in general when a customer makes payments or deposits, the customer 404 remits payments including credit card bill payments, credit card interest, and credit card fees to the credit card system 408 as usual. It should be appreciated that the customer can pay the customer's credit card bill any way desired except by way of such bill pay system where the funds are sourced from the same account being paid. In one embodiment of the invention, the customer cannot pay an enterprise credit account with a credit product issued by the same enterprise. In another embodiment of the invention, the customer cannot pay the credit card bill with a bill payment from the same credit card account.

Some of the clear advantages of the non-interchange Bill Pay advance methodology discussed herein are as follows. Advantages for the customer include: (1) access to credit line and possible float opportunities; (2) ability to pay any payee regardless of whether the payee accepts credit cards or not; and (3) ability and greater flexibility to control the timing and changes to the amount of payments. For example, if a customer signs up for recurring payments directly with a merchant and interchange is involved, then it can be difficult for a customer to subsequently change the instructions to the merchant. For example if a customer signs up for recurring payments to be made to a fitness center each month and then later closes or changes his or her credit card account, then it may be difficult to enforce the payee to discontinue debiting the customer's credit card account that has been closed or changed. The credit card issuer then continues to bill the customer for such charges. In contrast, with the inventive Bill Pay advance methodology herein, the customer controls when and if payments are made to the payee. Such control of payments is invisible to the payee. Advantages for the payee include: (1) no interchange fee and (2) normal bill payment experience, i.e. the payee is not required to be set up for credit and/or debit card processing. Advantages for the enterprise include: (1) because no new partners are required, both (a) speed of implementation increases, (b) credit card processing rules do not need to be changed, and (c) third party set ups are avoided; (2) large biller transaction volume is immediately eligible for processing; (3) synergies are generated for future funding sources for Bill Pay, e.g. business, home equity lines of credit, and the like; and (4) is a driver for Bill Pay service loyalty.

Details of Option 2, interchange push via credit card or debit card processing, can be described with reference to FIG. 5 (FIGS. 5a and 5b), a flow diagram of an embodiment of the bill pay advance methodology with interchange push according to the invention.

Figure 5A:
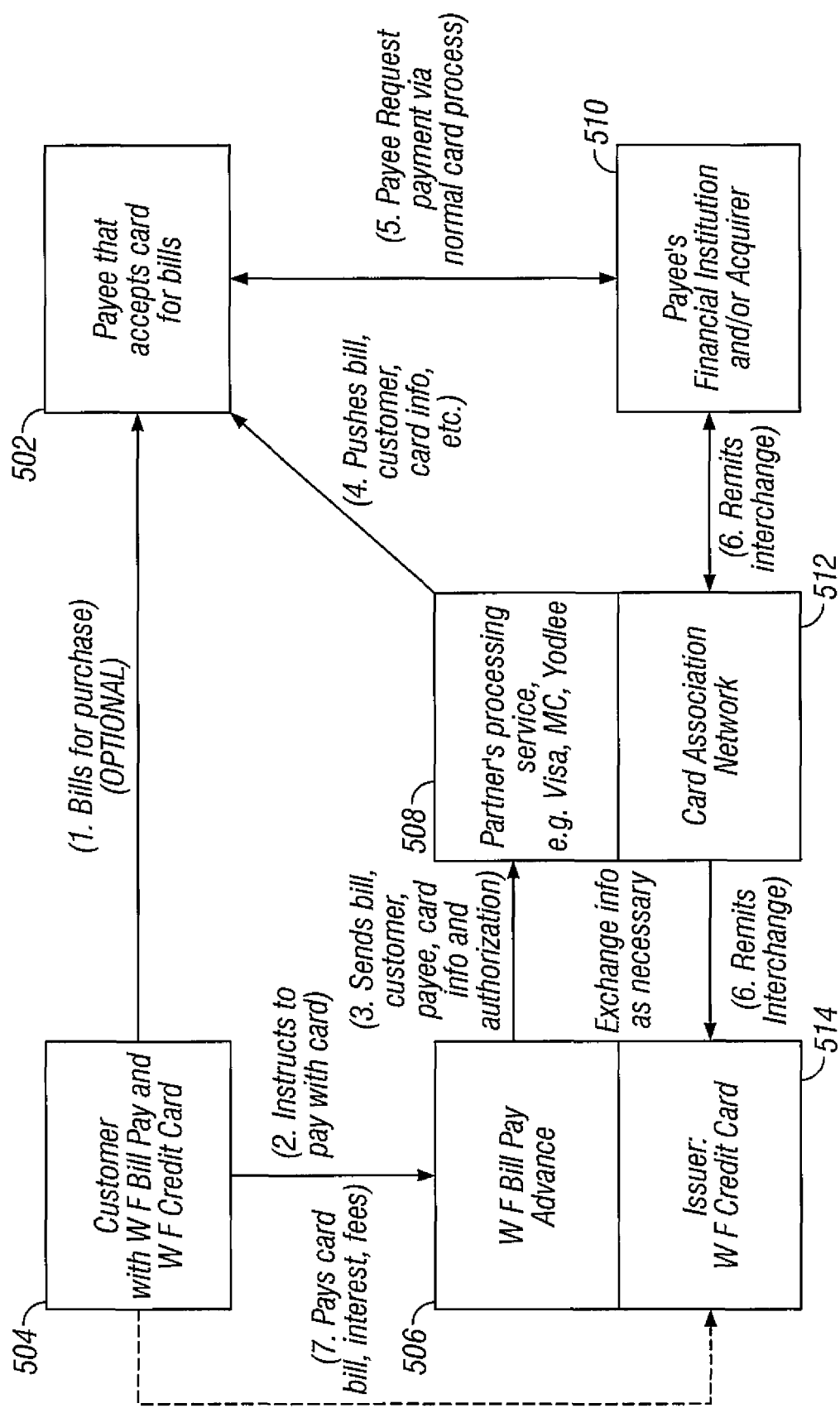
FIG. 5a is a flow diagram of an embodiment of the bill pay advance methodology using a credit card with interchange push according to the invention.

Referring to FIG. 5a, a customer 504 of an enterprise, such as Wells Fargo (WF), having an account in the enterprise's bill pay advance system and having an enterprise credit card account instructs the bill pay advance system 506 to make a payment with the credit card 514. In this embodiment of the invention, the transaction is routed as an interchange eligible transaction. One advantage to the customer is that the customer may be eligible for rewards points if the customer is a member of a rewards program. The transaction is processed through the interchange eligible purchase method as follows. The bill pay advance system pushes customer and billing information, such as card information and authorization, to a partner processing service 508, such as Wells Fargo, Visa International Service Association (VISA), or MasterCard International Incorporate (MasterCard). The partner processing service 508 then pushes the credit card-related information to the payee 502. One embodiment of the invention uses screen scrape technology with the payee's web site to fill the payee's payment information form on the payee's web site on behalf of the payor, i.e. customer. Then, the payee 502 uses the inputted information to process the transaction through the payee's financial institution or acquirer 510 through normal channels. The acquirer 510 then remits payment to the payee 502 as well as remits an interchange fee through the card association network 512 to the credit card issuer 514. It should be appreciated that in this embodiment of the invention, the transaction is effected by way of the bill pay advance system 506 leveraging a partner's processing system 508. In another embodiment of the invention, the partner processor 508, incorporating certain functionality such as provided by Yodlee.com Inc., scans the Internet for the merchant's web site, where the merchant supports interchange eligible payments. The bill pay advance system 506 then leverages the merchant's web site system on behalf of the customer 504 to effect the payment as an interchange eligible purchase transaction, such as by screen scrape technology as mentioned hereinabove. The customer 504 pays card payments, interest, and fees as usual to the credit card account 514.

Figure 5B:
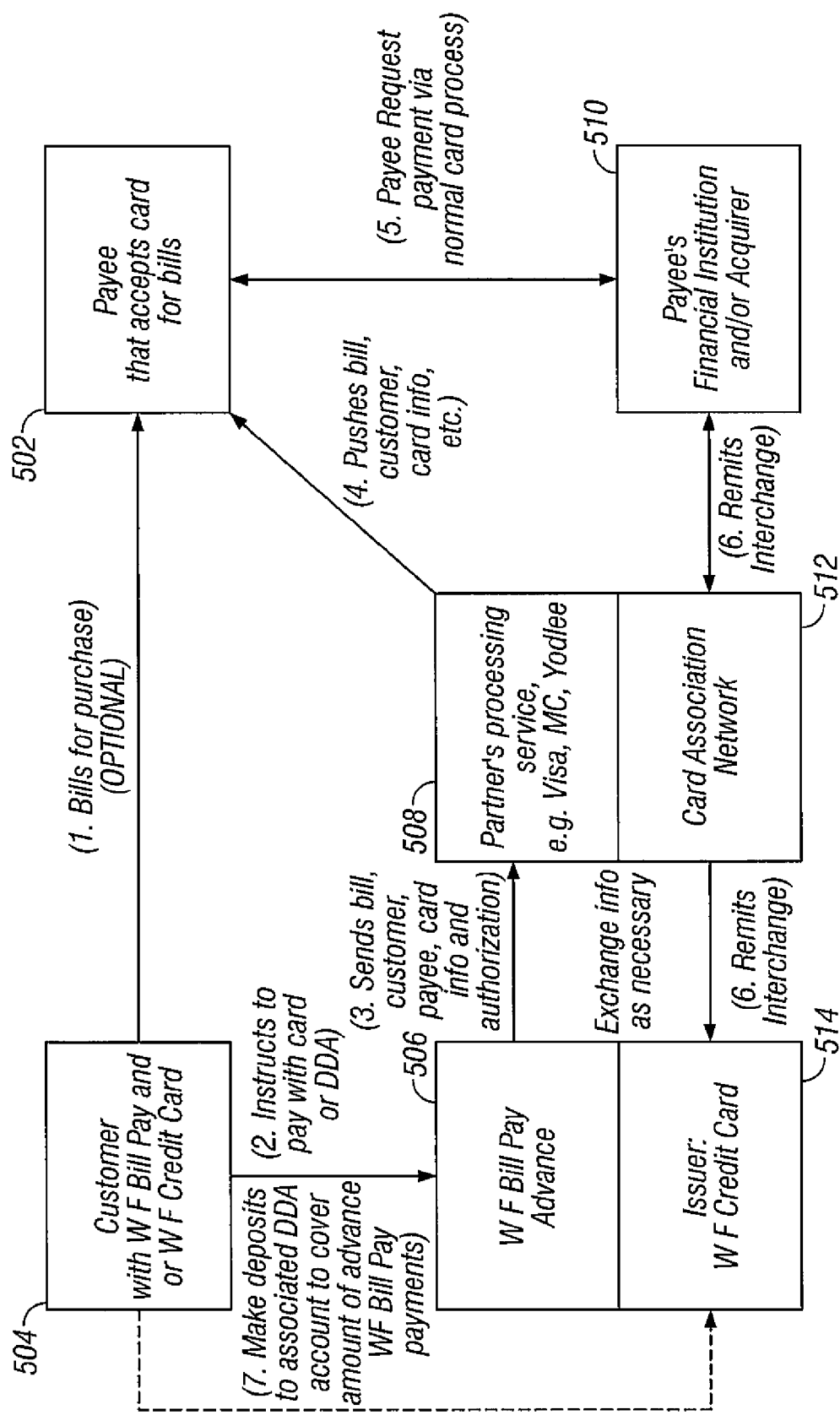
FIG. 5b is a flow diagram of an embodiment of the bill pay advance methodology using a debit card with interchange push according to the invention.

Referring to FIG. 5b, a customer 504 of an enterprise, such as Wells Fargo (WF), having an account in the enterprise's bill pay advance system and having an enterprise debit card account instructs the bill pay advance system 506 to make a payment with the debit card account or with the DDA 516. In this embodiment of the invention, the transaction is routed as an interchange eligible transaction. One advantage to the customer is that the customer may be eligible for rewards points if the customer is a member of a rewards program. The transaction is processed through the interchange eligible purchase method as follows. The bill pay advance system pushes customer and billing information, such as debit card information and authorization, to a partner processing service 508, such as Wells Fargo, Visa International Service Association (VISA), or MasterCard International Incorporate (MasterCard). The partner processing service 508 then pushes the debit card-related information to the payee 502. One embodiment of the invention uses screen scrape technology with the payee's web site to fill the payee's payment information form on the payee's web site on behalf of the payor, i.e. customer. Then, the payee 502 uses the inputted information to process the transaction through the payee's financial institution or acquirer 510 through normal channels. The acquirer 510 then remits payment to the payee 502 as well as remits an interchange fee through the card association network 512 to the debit card issuer 514. It should be appreciated that in this embodiment of the invention, the transaction is effected by way of the bill pay advance system 506 leveraging a partner's processing system 512. In another embodiment of the invention, the partner processor 508, incorporating certain functionality such as provided by Yodlee.com Inc., scans the Internet for the merchant's web site, where the merchant supports interchange eligible payments. The bill pay advance system 506 then leverages the merchant's web site system on behalf of the customer 504 to effect the payment as an interchange eligible purchase transaction, such as by screen scrape technology as mentioned hereinabove. The customer 504 makes deposits to the customer's associated DDA account to cover amount of advance bill pay advance payment to the debit account 516.

In one embodiment of the invention and for eligible transactions, a debit card is made the default even when payment by DDA is chosen by the customer 504. Such default may be advantageous to the enterprise because the enterprise can make more money via interchange, i.e. when a debit card is the payment vehicle versus the DDA directly. In this embodiment of the invention, the transaction is routed as an interchange eligible transaction. To the customer's perspective, such funds are still being debited from the DDA, however the debit card is used.

It should be appreciated that optionally, the payee 502 can submit a bill to the customer 504 and hence initiate the process.

It should further be appreciated that the bill pay advance system uses intelligent routing to identify that interchange eligible payments can be made to this payee either by way of a processing service 508 or by way of the Card Association network 512, including, for example, technology which scans the Internet on behalf of the customer and technology which fills in information in a merchant's web site. In another embodiment of the invention the bill pay advance system 506 or a partner processing service 508 searches the Internet to find merchants that permit customers to make payments. Thus, the bill pay advance system 506 and the partner processing service 508 act on behalf of the customer 504 to access and submit payments by leveraging the Internet infrastructure established by the payee 502.

One advantage of the bill pay advance with interchange push methodology is that the transaction is treated like a credit and/or debit card purchase versus an advance. Consumer credit card account purchases are typically subject to more favorable regulatory protections, usually have lower interest rates than advances and are more often eligible for points in reward programs. Debit cards that obtain rewards points are also eligible for such points as may be applicable.

At the end of the customer's credit and/or debit card cycle or at other times in general when a customer makes payments or deposits, the customer 504 remits payments including credit bill and/or debit card payments, credit card interest, and credit and/or debit card fees to the credit card system 514 and/or the debit card system 516 as usual. It should be appreciated that the customer can pay the customer's credit and/or debit card account any way desired except by way of such bill pay advance system 506 where the funds are sourced from the same account being paid. In one embodiment of the invention, the customer cannot pay an enterprise credit and/or debit account with a credit product or debit card issued by the same enterprise. In another embodiment of the invention, the customer cannot pay the credit and/or debit card account with a bill payment from the same card account.

Some of the clear advantages of the interchange via credit card methodology discussed herein include the following. Advantages for the customer include: (1) a customer has access to credit line and float; (2) it is likely that a customer can receive rewards points; (3) the purchase interest rate would apply which is typically lower than an advance interest rate; (4) such purchase type transaction also typically gets a grace period and no transaction fee whereas for an advance transaction the customer gets no grace period, a higher interest rate, and a transaction fee; and (5) regulatory protections for credit card purchase transactions can be greater than for advances. Advantages for the payee include: (1) the payee enjoys greater payment flexibility for payee's customers. Advantages for the enterprise include: (1) interchange fees are earned; (2) additional income is received from higher revolving credit card balances; (3) Bill Pay processing costs may decrease because the Bill Pay system doesn't move the money, the payee processes the transaction, and the Bill Pay system provides instructions to the payee; (4) is a driver for Bill Pay service loyalty; and (5) provides additional benefits for the rewards program because is another way to earn rewards points.

Some of the clear advantages of the interchange via debit card methodology discussed herein include the following. Advantages for the customer include: (1) experience is seamless to the customer as monies are debited directly from DDA and (2) receipt of reward points is likely. Advantages for the payee include: (1) greater payment flexibility for customers. Advantages for the enterprise include: (1) interchange fees are earned; (2) Bill Pay processing costs may be lower than today; (3) facilitates a large eligible customer base; approximately 95% of all consumers and approximately 45% of all business customers have debit cards; (4) a large number of interchange eligible transactions are made if the debit card is made the default Bill Pay funding mechanism, instead of DDA; and 5) is a driver for Bill Pay service loyalty. An advantage for the card association network is more network transactions.

An Exemplary Bill Pay with Card Funding System

One embodiment of the invention is described with reference to Wells Fargo's Bill Pay service. The Bill Pay service offers its customers the ability to select which of their eligible funding accounts they wish to use to pay their bills. In the initial Bill Pay system, only checking accounts (demand deposit accounts, DDA's) can be used for this purpose.

Hereinbelow describes how to add the ability for Bill Pay customers to use the following types of accounts to fund payments to eligible payees:

Wells Fargo Credit Card Accounts (System of Record—FDR); and
Wells Fargo BusinessLine$^{SM}$ Accounts (SOR—FDR)
Other funding account types may be added in future projects.

The Typical Bill Pay Environment
Customer Enrollment

In the environment, customers (consumers and businesses) who have signed up for online account access and who have at least one eligible checking account may enroll in the Bill Pay service. Customers must accept a Bill Pay Online Access Agreement (OM) and an eSign agreement in order to use the service.

Online Customer Service (OCS) Bankers may assist customers by executing certain steps of the enrollment process, but they are not permitted to accept these agreements on behalf of customers.

Customer Experience

Customers have the opportunity to select the funding account they wish to use for making payments at several points during their Bill Pay online experience:

They select a default Funding/Service Fee Account when establishing or updating their user profile within Bill Pay. The default Funding/Service Fee Account is the source of funds for making all payments, unless overridden by the customer for a specific payee or a specific payment. The default Funding/Service Fee Account also serves as the account that is charged for any applicable Bill Pay service fees. If a customer does not select a default Funding/Service Fee Account within 45 days of enrollment, Bill Pay assigns one using an automated process.

When adding or editing payees using the service's Manage Payees function, customers with more than one eligible funding account may select a funding account, other than the default, for specific payees.

When making scheduling payments, customers may specify a one-time funding account, other than the one they have associated with the payee.

At each of these points, customers have the ability to select the desired funding account from a drop-down list of their eligible checking accounts. OCS Bankers may also make these selections on the customer's behalf, using the Customer Service Application (CSA).

In addition to the funding account, customers and bankers specify the payment frequency, i.e. one-time or recurring, schedule and amount for each payment. Currently, both the Bill Pay Customer User Interface (CUI) and CSA limit individual payments to a maximum of $50,000.

Batch Processing

Customers may change their payment information, including their choice of funding account, until the cut-off time, e.g. 7 p.m. PT, Monday through Friday, excluding non-business days, on the scheduled payment date, after which Bill Pay batch processing begins.

The Bill Pay service uses a good funds model to authorize payments. Account status and available balance are verified prior to releasing each payment.

Bill Pay sends payment information to a system area, ODS/PAS, via a batch file, to debit funds from the customer's checking account. ODS/PAS responds to let Bill Pay know if there are any failures in debiting funds from the customer's account. Certain failures, e.g. NSF, are retried a second time on the next business day, while others, e.g. account closed, result in the payment being cancelled immediately.

As a result of Bill Pay On-Us Settlement process, there are two paths along which Bill Pay may send payment information and receive feedback on funds availability: the new DZ-EPAY path, for selected internal payees, and the ODS/PAS path, for all other payees.

After receiving feedback that the customer's funding account is debited successfully, e.g. via a status file from ODS/PAS or DZ, Bill Pay releases payment information to the appropriate endpoint, i.e. payment processor, for fulfillment to the payee.

A credit to the Bill Pay Wholesale DDA account offsets the customer funding account debits for payments destined to external payees. It should be appreciated that with the implementation of On-Us Settlement, selected internal payees are credited directly via the DZ-EPAY process.

An Online Customer Service (OCS) Accounting and Control system area manages the movement of funds from the Bill Pay Wholesale DDA account to each endpoint, using the agreed mechanism for each endpoint. Bill Pay produces the reports that are used by OCS Accounting and Control for reconciliation and settlement.

In subsequent processing cycles, Bill Pay receives feedback from each payment processor, indicating the success or failure of posting each payment. Payments that could not be applied are credited back to the customer's funding account through transactions automatically created by Bill Pay, or manually entered by OCS. The Bill Pay Wholesale DDA account receives the debit that offsets the customer credit.

Customer Service

Customers and OCS Bankers may access information on the status of payments through Bill Pay in-session notices, email alerts, online status displays and online reports. OCS Bankers also may access status information on the Payment Detail History and Payee Audit History screens in a customer service representative system area (herein referred to as CSA.

Bill Pay debits and credits are identified as such on the customer's funding account statements and online transaction history.

Customers may contact Wells Fargo with questions or issues regarding the Bill Pay service, either in person, by phone, or online using a customer-submitted payment inquiry form. OCS Bankers may also submit a payment inquiry form on the customer's behalf. Payment inquiries are directed to OCS team members, who are responsible for tracking cases using CCM OCTS, submitting adjustments, and notifying customers of case resolution.

A Bill Pay Advance Environment

The Bill Pay Advance environment gives Bill Pay customers new funding account choices. To provide the best customer experience, the environment parallels the existing environment. Differences between the Bill Pay funded by DDA (referred to hereinbelow as the current environment) and the Bill Pay advance funded by card or other credit products with or without interchange (referred to hereinbelow as the proposed environment) are outlined hereinbelow.

Eligibility for Card Funding

Three dimensions of Card Funding eligibility, i.e. customer eligibility, account eligibility and payee eligibility, are introduced in the following sections, with more detail provided later in the document.

The section on customer eligibility describes which Bill Pay customers are able to use their Credit Card or BusinessLines$^{SM}$ accounts to make payments.

The section on account eligibility describes which Credit Card/BusinessLines$^{SM}$ accounts may be used to fund payments.

The section on payee eligibility describes which payees may or may not be paid from Credit Card/BusinessLine$^{SM}$ accounts.

Customer Eligibility for Card Funding

Card Funding is available to Consumer and Business Bill Pay customers with eligible card funding accounts and appropriate account relationships.

Card Funding is activated by default for all eligible Business- and Consumer-branded Bill Pay customers.

The CIS Relationship Code table is updated to make Credit Card account holders, i.e. Sole Borrowers, Primary Borrowers and Secondary Borrowers, valid for Bill Pay.

Account Eligibility for Card Funding

When the embodiment of the invention is implemented, eligible Wells Fargo Credit Card and BusinessLines$^{SM}$ accounts are included in the list of Bill Pay funding accounts, if they are open and in good standing, i.e. not delinquent or over-limit.

Payee Eligibility for Card Funding

When the embodiment of the invention is implemented, customers with the appropriate funding accounts are able to choose between DDA and Card Funding accounts for most payees.

Some payees will not be eligible for card-funded payments, due to risk management or other business considerations. Bill Pay controls eligibility at the merchant level; the eligibility of all payees associated with a merchant is the same as that merchant's eligibility.

At implementation, the only ineligible merchants are Wells Fargo credit accounts, i.e. cards, lines, and loans.

Because it is expected that the list of ineligible payees is fairly static, the Sustaining Engineering team is responsible for maintaining the list within the Bill Pay application, until such time as an update capability is implemented within the Online Admin Tool (OAT). The OAT implementation is outside the scope of this discussion, and it is not a dependency of this embodiment of the invention. The Bill Pay Product Office works with Payee Management to identify and communicate to Sustaining Engineering any changes to this list.

Merchant/payee eligibility for Card Funding is not visible or modifiable within CUI or CSA.

The Bill Pay FAQs are updated to disclose to customers which payees are ineligible to be paid via Card Funding.

Customer Enrollment

As is the case today, to enroll in the Bill Pay service, customers must have an eligible DDA account to serve as the default Funding/Service Fee account.

The Bill Pay section of the OM shall be revised to reflect the addition of Card Funding capabilities. No changes to the esign agreement are required.

There shall be no additional enrollment process for Card Funding. Customers with eligible funding accounts are automatically set up to use Card Funding.

Introducing Card Funding

Card Funding Enabled by Default

At the implementation of the embodiment of the invention, Bill Pay activates the Card Funding feature by default for both new and existing Bill Pay customers.

With Card Funding enabled, customers see their eligible Card Funding accounts in the Payment Account drop-down lists, as appropriate. If a customer has no eligible Card Funding accounts, only eligible checking accounts are displayed in the Payment Account drop-down lists.

Prior to a customer's making a different payment method selection, the drop-down menu displays the customer's default Funding/Service Fee account.

Card Funding Splash Page

As part of the promotional strategy for the feature, existing Bill Pay customers may receive an Enterprise Customer Profile and Referrals (ECPR) targeted marketing offer with information about Bill Pay Card Funding. The feature is announced via a WIB-hosted splash page. Since Card Funding is a standard Bill Pay feature, customers do not have the option of accepting or rejecting the ECPR offer. Instead, there is a continue (or similar) button followed by Bill Pay's standard screen navigation.

Because the splash page does not drive specific Bill Pay behavior, testing of the splash page shall be handled separately and shall be considered out of scope for this discussion.

Card Funding Terms and Conditions

Customers shall be notified of the fees and terms associated with making payments from their Card Funding accounts.

Terms and conditions shall be included in marketing materials including ECPR splash pages.

Fees and terms shall be displayed to customers during the Make Payment process whenever card-funded transactions are scheduled. See hereinbelow for more information.

Customers shall be advised of any changes to Card Funding terms and conditions via email alerts and in-session notices generated by Bill Pay. See hereinbelow for more information.

Customer Experience
Payment Methods

As is currently the case, customers, including OCS Bankers on their behalf, select the funding account for making payments at various points during their Bill Pay online experience.

The Bill Pay in-session enrollment process is modified to ensure that only eligible checking accounts may be selected as default Funding/Service Fee Accounts for the Bill Pay service. Customers are not able to select a Credit Card or BusinessLine$^{SM}$ account as the default Funding/Service Fee Account.

This does not preclude the implementation of other default funding account types.

As is currently the case, if the customer does not specify a default Funding/Service Fee Account within 45 days of enrolling in Bill Pay, then an eligible checking account is systematically assigned. The get_pm (get payment method) process is modified to permit only checking accounts to be assigned as the default Funding/Service Fee account.

When presented with the opportunity to select a payee-specific or payment-specific funding account within the Add Payees, Manage Payees and Make Payments functions, customers and OCS Bankers see eligible card funding accounts, in addition to checking accounts, in the drop-down lists for eligible payees.

Card funding accounts are not displayed in the drop-down payment account list if the payee is ineligible for Card Funding. It should be appreciated that when a user enters a payee manually, if the automated scrub and match logic then associates the payee with a merchant that is ineligible for Card Funding, then the user interface must detect this and prevent the user from scheduling or saving card-funded payments to this payee.

As is the case today, the funding accounts presented to the customer are filtered based on the Bill Pay brand; i.e. Business Bill Pay customers may select from among their eligible business and consumer accounts, but consumer Bill Pay customers do not see their business accounts in the list of eligible funding accounts.

Screens, reports, alerts and notices that currently display funding account information are modified to display checking or card/credit account information, as appropriate.

Making Payments
Per-Transaction Limits.

When making payments, customers specify the payment frequency, e.g. one-time, recurring or automatic, and schedule an amount for each payment. For risk management purposes, the user interface limits individual payments to a maximum of $50,000 in today's environment.

In the proposed environment, the Bill Pay user interface applies the following product-specific per-transaction limits in Table A.

TABLE A

| Funding Account Type | Per Transaction Limit |
| --- | --- |
| Checking | $50,000 |
| Consumer Credit Card | $10,000 |
| Business Credit Card | $10,000 |
| BusinessLine $^{SM}$ | $50,000 |

The CUI checks payments added or edited during the current Bill Pay payment scheduling session, regardless of the date that the payment is to be made, against these limits.

Bill Pay uses the Product/Sub-product Code table to determine the funding account type.

Customers are notified of the limit in an on-screen message, which varies by funding account type, and are required to edit their payment(s) if any limits are exceeded.

It should be appreciated that in addition to the per-transaction limits imposed by the Bill Pay CUI, there are daily funding account limits specific to each type of Card Funding account. As described hereinbelow, transactions that would cause these daily limits to be exceeded are not memo-posted by DZ; instead, they are returned to Bill Pay and retried the next business day.

Card Funding Fees and Terms.

Current Card Funding fees and terms are displayed to customers during the Make Payment process whenever card-funded transactions are scheduled.

When the customer clicks "submit" to schedule his or her payments, if any card-funded transactions are scheduled, Bill Pay displays a new screen that includes the fees and terms associated with the selected funding accounts only. Terms that apply to funding accounts not selected by the customer are not be displayed.

The customer has the option to accept the terms and complete the scheduling of the transactions or to edit the payments, which returns the customer to the prior screen to select different Payment Accounts.

Batch Processing—Payments

As is the case today, customers are able to change their payment information until the cut-off time, e.g. 7 p.m. PT Monday through Friday, excluding non-business days, on the scheduled payment date, after which Bill Pay batch processing begins.

The DZ-EPAY path implemented by the Bill Pay On-Us Settlement project is replicated and modified to provide a new processing path that handles card-funded payments, i.e. Bill Pay advances. In keeping with Bill Pay's good funds model, account status and available credit are verified before releasing payments to the endpoints.

At a high level, the processing is as follows:

As is the case today, Bill Pay batch processing verifies that payments do not exceed the per-transaction limits indicated in the Making Payments section. Because such transactions should be blocked by the CUI, this edit is a precautionary measure. As is the case with today's edit for DDA-funded payments, Bill Pay silently cancels, i.e. without a notice or alert being sent, any transactions failing this edit.

For each Bill Pay Advance, Bill Pay sends DZ the customer's card funding account number as the account to be debited, i.e. the "from" account. The Bill Pay Wholesale DDA account receives the offsetting credit, i.e. the "to" account.

It should be appreciated that payees that are associated to endpoint DZ are ineligible to be paid from Card Funding accounts. In creating payment files, Bill Pay ensures that DZ does not receive transactions from a Card Funding account to an on-us settlement payee. For card-funded payments, the to account is always the Wholesale DDA account.

In creating the Card Funding transaction file for DZ, Bill Pay provides the data elements needed for DZ to sort transactions for each funding account in the following sequence: transactions being presented a second time, e.g. previously rejected due to NSF, are sorted ahead of those being presented for the first time; within each of those groupings, transactions for a given Card Funding account are sorted in descending dollar amount order within payment type, such as automatic payments first, followed by recurring payments, followed by one-time payments.

It should be appreciated that the sort sequence for card-funded transactions may be different from the order in which DDA-funded transactions are processed. Regulation CC and the laws of individual states dictate the sequence in which DDA transactions are processed; in some states, transactions are processed from low to high dollar amount, while in others, they are processed from high to low. Because there is no such requirement for credit card transactions, the sort sequence specified in the bullet above applies to all card-funded payments.

Each transaction is processed as described below. Note that if there are multiple transactions for a single card funding account, and an earlier higher-dollar transaction is rejected due to insufficient credit, subsequent lower-dollar payments could still process successfully.

DZ keeps a running total of the dollar amount of card-funded transactions successfully memo-posted for each Card Funding account as it processes transactions for that account.

DZ checks the daily funding account limit for the applicable Card Funding account type, for example, Consumer Credit Card, Business Credit Card, and BusinessLine$^{SM}$, and does not attempt to memo-post transactions that would cause the applicable daily limit to be exceeded.

In those cases, DZ returns the transactions to Bill Pay in the DZ-EPAY Card Funding Payments Status File, using a new return code (10009) indicating that the transaction would cause the daily limit to be exceeded. Bill Pay tries those transactions a second time, the next business day. Bill Pay cancels payments that are returned by DZ for exceeding the daily limit a second time, and notifies customers with a new in-session Notice and email Alert, which can be created for this purpose.

The following daily limits in Table B hereinbelow are applied by this process:

TABLE B

| Funding Account Type | Tran Code | Daily Funding Account Limit |
|---|---|---|
| Consumer Credit Card | 0473 | $10,000 |
| Business Credit Card | 0476 | $10,000 |
| BusinessLine $^{SM}$ | 0477 | $50,000 |

If the transaction does not cause the daily limit to be exceeded, then DZ attempts to memo-post the debit to the funding account on the intra-day file. During this process, account status and available credit are checked against the intra-day file.

If the account is in good standing, i.e., open and not delinquent, and there is sufficient available credit, DZ memo-posts the debit on the intra-day file.

Transactions that have been successfully memo posted are not included in the DZ-EPAY Card Funding Payments Status File sent to Bill Pay, due to Bill Pay batch performance considerations. Bill Pay sets those payments not returned by DZ in the Status file to Paid status in the database.

If the account is open but delinquent, DZ returns the transaction to Bill Pay in the DZ-EPAY Card Funding Payments Status File with an appropriate return reason code, which can be determined during design. Bill Pay tries the transaction a second time, the next business day. If the account is still delinquent, Bill Pay cancels the payment and notifies the customer by sending a modified version of certain notices #17N and Alert #17S.

If the account is in good standing but available credit is not sufficient to cover the Bill Pay Advance, then DZ indicates this with an appropriate return reason code, which can be determined during design, when it returns the transaction to Bill Pay in the DZ-EPAY Card Funding Payments Status File. As with DDA-funded payments rejected due to NSF, Bill Pay tries the transaction a second time, the next business day. If the available credit is still insufficient, then Bill Pay cancels the payment and notifies the customer with a modified version of certain notices #17N and Alert #17S.

If the account is in any status other than some form of open, DZ indicates this in the DZ-EPAY Card Funding Payments Status file with an appropriate return reason code, which can be determined during design. Bill Pay cancels the current day's payments from that funding account, with customer notification and operational reporting as is currently done for DDA-funded payments, using a modified version of Notice #20N and Alert #20S.

Accepted and rejected Bill Pay Advances appear on the new DZ-EPAY Card Funding Payments Accepted and Payments Rejected Reports, respectively.

DZ sends all transactions that were successfully memo posted, via NMIC/GV and DE, to the SOR for hard posting.

DZ sends Card Funding transactions to NMIC separately from Bill Pay On-us Settlement transactions. This feed to NMIC is a new track for the existing Bill Pay source.

One record is sent to FDR (via NMIC/GV, DE and FF) for each successful Bill Pay Advance transaction. These transactions must be force-posted at FDR, because the corresponding funds have already been sent to the payment processors.

DZ sums all transaction amounts destined for the Bill Pay Wholesale DDA account and sends one record for the net dollar amount to NMIC/GV for hard posting on Hogan. Memo posting to the Wholesale DDA account is not required and is not performed.

If the transaction is not returned, i.e. rejected, in the DZ-EPAY Card Funding Payments Status File, Bill Pay sets the payment status to paid and releases the payment to the endpoint.

In the rare event that DZ is unavailable and Bill Pay does not receive the Payments Status File in time, Bill Pay Operations may decide to release the payments to the endpoints in order to meet service levels, in which case adjustments to customers' Card Funding accounts needs to be made by Card Services Finance if it is subsequently discovered that the transactions were not memo-posted successfully. This situation, which could occur today for DDA-funded payments if status is not received from ODS/PAS, is expected to be virtually non-existent. As is the case today, Bill Pay would set the internal status to "paid conditional" rather than "paid" under this condition.

Bill Pay produces the necessary reports to be used by OCS Accounting and Control for reconciliation and settlement.

Rejected items are reported with the DZ-provided reason code on Bill Pay settlement report #2, Hogan Rejects, which is renamed to cover both Hogan and FDR SORs).

Canceled items are reported with the reason code provided by DZ or Bill Pay, as applicable, on Bill Pay settlement report #6, Cancelled Payments.

As they do today, OCS Accounting and Control manage the movement of funds from the Bill Pay Wholesale DDA account to each endpoint, using the agreed mechanism for each endpoint. Customer funding sources are not visible to the endpoint and therefore do not affect payment to the endpoint.

Bill Pay Advance Transaction Characteristics

Bill Pay Advances are coded as Purchase transactions for Consumer Credit Card accounts, and as Cash Advance transactions for Business Credit Card and BusinessLine$^{SM}$ accounts. The initial pricing strategy, e.g. interest rate, grace period, and transaction fee, for each type of funding account is documented in the subsections that follow. Pricing strategies may change from time to time, based on business need.

The following regarding future changes should be appreciated:

Certain types of pricing strategy changes would require that new tran codes be defined in the impacted systems (Bill Pay, DZ, NMIC/GV and FF). These types of changes include, but are not necessarily limited to: (1) changing the transaction type (from Purchase to Cash Advance or vice versa), and (2) adding or eliminating a per-transaction fee. Changes of this nature would necessitate a systems development project to implement.

Changes within the pricing strategies being implemented with this project, for example, changing a fee amount or allowing a grace period, would not require new tran codes to be defined, nor would a systems development project be needed. Changes of this nature could be coordinated through Card Services' Systems Management and Consulting (SMC) group.

As a point of information regarding no systems impact, Bill Pay advance transactions are not subject to the card associations' chargeback and dispute rules because they do not involve an external merchant or acquirer. If they should meet the appropriate criteria, they would fall under Reg Z, which defines the timeframes for reporting, responding to and resolving customer issues.

Bill Pay Advances from Consumer Credit Card.

The following table, Table C, describes the Bill Pay advance transaction characteristics for Consumer Credit Card:

TABLE C

| | |
|---|---|
| Funding Account | Consumer Credit Card |
| Transaction Type | Purchase |
| Transaction Code/ Internal Description | 0473 - Bill Pay Purchase with Fee |
| Transaction Rate (APR) | Standard Purchase (Merchandise) Rate |
| Grace Period | No grace period |
| Transaction Fee | 2% (no minimum, no maximum) |
| Rewards | No |
| Credit Card Statement APR/ADB Line | Separate "Bill Pay Advance" APR/ADB line under "Purchase" category |
| Credit Card Statement Transaction Descriptor/Online Account History Transaction Description | To be determined during Design (40 characters available) |

Bill Pay Advances from Business Credit Card.

The following table, Table D, describes the Bill Pay Advance transaction characteristics to be implemented for Business Credit Card:

TABLE D

| | |
|---|---|
| Funding Account | Business Credit Card |
| Transaction Type | Cash Advance |
| Transaction Code/ Internal Description | 0476 - Bill Pay Advance with Fee |
| Transaction Rate (APR) | Standard Cash Rate |
| Grace Period | No grace period |
| Transaction Fee | 3%, minimum = $10, maximum = $75 |
| Rewards | No |
| Credit Card Statement APR/ADB Line | Include in existing APR/ADB line under "Cash Advance" category |
| Credit Card Statement Transaction Descriptor/Online Account History Transaction Description | To be determined during Design (40 characters available) |

Bill Pay Advances from BusinessLine$^{SM}$.

The following table, Table E, describes the Bill Pay Advance transaction characteristics to be implemented for BusinessLine$^{SM}$.

BusinessLine$^{SM}$ accounts are identified by sub-product code 021 and account prefix 547464. (Note: Sub-product code 021 may be associated with account prefixes other than 547464, but account prefix 547464 is associated with only sub-product code 021.)

TABLE E

| Funding Account | BusinessLine <sup>SM</sup> |
|---|---|
| Transaction Type | Cash Advance |
| Transaction Code/ Internal Description | 0477 - Bill Pay Advance No Fee |
| Transaction Rate (APR) | Standard Cash Rate |
| Grace Period | No grace period |
| Transaction Fee | No transaction fee |
| Rewards | No |
| Credit Card Statement APR/ADB Line | Include in existing APR/ADB line under "Cash Advance" category |
| Credit Card Statement Transaction Descriptor/Online Account History Transaction Description | To be determined during Design (40 characters available) |

Batch Processing—Payment Exceptions

As is the case today, payments returned as unprocessed by the endpoints in subsequent processing cycles, e.g. through existing file exchange processes in place with each endpoint, are included on the appropriate Bill Pay reports.

Unlike DDA-funded payments, card-funded items returned by the endpoints cannot be automatically credited back to the funding account. Card Services Finance are responsible for entering cardholder adjustments manually pending possible future implementation of an automated adjustment capability, including reversing transaction fees and finance charges as appropriate.

- When payments are rejected or returned by the endpoint, Bill Pay follows its existing automated processes to update the payment status internally and as displayed on CUI and CSA.
- With returned DDA-funded payments, where Bill Pay builds an adjustment transaction to be sent via ACH, the payment status is not updated until the adjustment is sent out. For returned card-funded payments, Bill Pay must update the payment status despite not creating an adjustment transaction.
- Items returned by the endpoints are broken out on Bill Pay reports and totaled separately by funding account type, DDA-funded vs. card-funded. OCS business requirements for reporting are documented separately.
- Reports distinguish between returned payments, e.g. invalid payee account entered, and adjustments, e.g. credit for payee late fee due to endpoint error. Such requires no changes to the existing process for returns, either for the endpoints or for Bill Pay—specifically as relates to the endpoint-Bill Pay interface. As indicated earlier in this section, Bill Pay cannot generate adjustments for card funding accounts as it can for checking accounts.
- OCS Accounting and Control receive all reports; Card Services Finance receive a copy of those reports listing returned card-funded payments and endpoint adjustments. This reporting is produced as part of the Bill Pay batch cycle, using the same mechanisms as other settlement reporting.
- The endpoints continue to remit, e.g. via wire transfer, ACH credit, etc., the funds covering their returned payments to the Bill Pay Wholesale DDA account.
- OCS Accounting and Control moves funds to cover returned, card-funded payments to Card Services Finance by means of a new General Ledger Settlement account, which can be determined during design and implementation.

It should be appreciated that the endpoints credit Wells Fargo with the payment amount only. The funding for transaction fee and finance charge reversals are handled within Card Services.

Batch Processing—File Maintenance

Closed and Transferred Accounts

Each processing day, Bill Pay receives information from the System of Records (SORS) regarding closed and transferred funding accounts. Based on this information, Bill Pay performs database updates, i.e. updating funding account numbers on scheduled payments, for transferred accounts, or canceling scheduled payments, for closed accounts.

In the current environment, funding accounts are limited to DDA accounts; the status of those accounts is obtained from the SOR (Hogan) via ODS/PAS as follows:

- Each processing day, Bill Pay sends ODS/PAS the "XREF" file, which contains all active and recently closed DDA funding accounts.
- ODS/PAS checks these accounts against the SOR, and returns two files—one containing closed accounts, and one containing transferred accounts, i.e. "from" account number and "to" account number.
- Bill Pay updates the stored payment methods appropriately.

In the proposed environment, an additional file exchange process is implemented between Bill Pay and FF (a Credit Card Hub), to obtain credit card account closures and transfers from the FDR SOR. Conceptually, the process mirrors today's information exchange between Bill Pay and ODS/PAS:

- Each processing day, Bill Pay sends FF a file of all active Card Funding accounts.
- FF checks these accounts against the SOR, and returns file(s) containing closed accounts and transferred (typically, reissued) accounts. It should be appreciated that FF would notify Bill Pay of relationship changes through a combination of "closed" and "transferred" records. For example, removal of one signer from a joint account would result in a "closed" record for the customer being removed from the account, and a "transferred" record indicating a new account number for the remaining customer.
- Bill Pay updates the stored payment methods appropriately.

The criteria for determining closed and transferred account events are defined and documented during the design phase of the project.

Closed Accounts—Impact on Pending Payments

Default Funding/Service Fee Account Closure.

As is the case today, Bill Pay customers with a closed or no longer eligible default Funding/Service Fee Account have 30 calendar days to establish a new default Funding/Service Fee Account. As a reminder, in both the current and proposed environment, the default Funding/Service Fee Account must be a checking account. After 30 days, if a default Funding/Service Fee Account is not established, the Bill Pay service is canceled.

During this 30-day period, payments that are scheduled using a valid funding account continue to be made. After the 30-day period, if a new default funding account is not established and the service is canceled, then any outstanding payments are canceled. The customer receives the Bill Pay Service Cancellation email alert (#23) listing both cancelled card-funded and DDA-funded payments.

Card Funding Account Changes.

When notified by FF of a change in card funding account number, i.e. account transfer, Bill Pay updates the payment method in the database and scheduled payments to reflect the new account number. The customer receives the Account Transfer notice (#21) reflecting the change. It should be appreciated that this notice includes "from" and "to" account numbers; these must be properly formatted based on the type of account.

When notified by FF that the card funding account is no longer valid, e.g. closed account, Bill Pay cancels pending payments and suspends automatic payments in the same way DDA-funded payments are handled today. The customer receives the Funding Account Status notice and email alert (#20) listing the canceled payments.

Changes to Payee Eligibility

As indicated elsewhere herein, not all payees are eligible to be paid via Card Funding. Bill Pay maintains a list of ineligible merchants, whose associated payees are ineligible for Card Funding.

The Bill Pay user interface (CUI and CSA) shall not display card funding accounts in the drop-down Payment Account list if the payee is ineligible for Card Funding, thus preventing the customer from scheduling a card-funded payment to an ineligible payee. In addition, should a user create a private payee that is subsequently scrubbed and matched to an ineligible managed payee, the user interface shall prevent card-funded payments to that payee from being scheduled.

Because the list of ineligible merchants, i.e. payees, is subject to change, card-funded payments may be stored for payees who, at the time of scheduling, are eligible for Card Funding, but who later become ineligible. Cases where this condition could occur include:

When an existing merchant is added to the list of ineligible merchants, i.e. a merchant goes from being eligible for card funding to ineligible, and card-funded payments have previously been scheduled.

When a processing or timing problem occurs such that the user interface is unaware that a payee has been set to ineligible and allows a card-funded payment to be scheduled.

When a redirection occurs after card-funded payments have been scheduled and the target merchant is ineligible, e.g. when a private payee is redirected to an "on-us" (DZ) merchant).

When an internal (DZ-EPAY) payee is established but is accidentally not added to the list of ineligible merchants.

When Bill Pay batch processing detects this condition its response shall be to cancel pending card-funded payments and notify the customer via in-session Notice and email Alert.

Customer Notification of Changes in Terms

Customer is notified when Card Funding transaction terms and conditions are scheduled to change.

Customers are notified of upcoming changes in terms by means of a new in-session notice and targeted global email alert. The notice and alert are sent at least 15 days in advance of the effective date of the changes to all Bill Pay customers who have eligible Card Funding accounts. The notice and alert is not sent to customers who do not have Card Funding.

The effective date and specifics of the new terms are included in the notice and alert.

Additionally, the notice and alert are resent to eligible customers on the effective date of the change in terms or the business day before, if the effective date falls on a non-business day.

It should be appreciated that advance notice of any change in terms are required in order to allow time for developing and testing each situation-specific notification.

Customer Service

As is the case today, in the proposed environment, customers and OCS Bankers access information on the status of payments through Bill Pay in-session notices, email alerts, online status displays and online reports. OCS Bankers continue to use the Payee Audit History and Payment Detail History screens in CSA as well.

Bill Pay debits are identified clearly on customer funding account statements and online transaction history.

Customers can continue to contact Wells Fargo with questions or issues regarding the Bill Pay service, either in person, by phone, or online using a customer-submitted payment inquiry form. OCS Bankers may also submit a payment inquiry form on the customer's behalf. It should be appreciated that no changes to the payment inquiry form are required for this project. Payment inquiries are directed to OCS team members, who are responsible for tracking cases using CCM OCTS, submitting adjustments, and notifying customers of case resolution.

In the current environment, OCS representatives may submit debit and credit adjustments to customer checking accounts as appropriate to resolve cases. Because they do not have the ability to process adjustments for Credit Card or BusinessLine$^{SM}$ accounts, coordination between OCS and Card Services are required to conduct research, resolve issues, and make adjustments to card accounts.

Processes are put in place so that each group may bring its expertise to bear in achieving the goal of "one and done," i.e. resolving the customer's inquiry with a single call to Customer Service.

Payment Inquiries/Claims

Payment inquiries are submitted through CUI and CSA to the CCM OCTS claims system. Two of the data elements that are passed to OCTS are the Funding Account and the routing and transit number (RTN) associated with that Funding Account.

In today's environment, the Funding Account format is nnnnDDAaaaaaaaaaa, where nnnn is the 4-digit Hogan company ID number (COID), DDA is the product type, and aaaaaaaaaa is the 10-digit (Hogan DDA) account number. The RTN is the 9-digit bank routing number for the Funding Account.

OCS Bankers use the account information for research purposes. It is possible that the account type, e.g. DDA for DDA-funded payments, and XCC, MC or VI for card-funded payments, drive the assignment of the claim to specific work queues within Bill Pay Operations. OCS Business Specifications for any changes to OCS systems are documented separately.

For claims on DDA-funded payments, no changes to the Bill Pay-OCTS interface are required or desired.

For claims on card-funded payments, it is assumed that Bill Pay passes Funding Account information to OCTS as follows:

The Funding Account number shall appear in the format nnnnXXXaaaaaaaaaaaaaaaa, where nnnn is the 4-digit company ID (0448 for credit card), XXX is the 3-character product code (XCC, MC or VI—research required to determine how 2-character product codes are passed), and aaaaaaaaaaaaaaaa is the 16-digit credit card account number.

The RTN shall be one of the following: 56590473x, 56590476x, 56590477x, 54480473x, 54480476x, or 54480477x—where x is a check-digit (research required to determine values).

Fraud Prevention

No new fraud reports are required. Card-funded payments over $600 are included, along with DDA-funded payments, on the existing fraud report produced by the Sustaining Engineering team. No changes to the format of this report are required, beyond ensuring that Card Funding account numbers appear correctly.

It is expected that Card Services and OCS monitor the Bill Pay Advances for fraud, in the same manner as any other transaction.

Exemplary GUI Screens

Figure 9:
FIG. 9 is an example of a screen shot showing a Make Payment tab wherein the Payment Account and Amount column includes credit and checking accounts according to the invention.

FIGS. 6-10 are example screen mock-ups of the exemplary Bill Pay system. Specifically, FIG. 6 is an example of a screen shot showing a credit card being chosen for the Payment Account. FIG. 7 is an example of a screen shot showing the Edit Payment tab where the Payment Account selection is a credit card. FIG. 8 is an example of a screen shot showing a Status Update tab wherein the Financial Accounts include checking and credit card accounts. FIG. 9 is an example of a screen shot showing a Make Payment tab wherein the Payment Account and Amount column includes credit and checking accounts. And, FIG. 10 is an example of a screen shot showing three credit sources for funding a Bill Payment advance.

It should be appreciated that when appropriate, error messages are unique for each funding account type. Example appropriate error messages for each type of funding source follow:

"Your payment amount cannot exceed $50,000 for a checking account funded payment."
"Your payment amount cannot exceed $10,000 for a consumer credit card funded payment."
"Your payment amount cannot exceed $10,000 for a business credit card funded payment."
"Your payment amount cannot exceed $50,000 for a BusinessLine™ account funded payment."

Exemplary Settlement Reports

It should be appreciated that the following sample reports are example bill pay reports showing where the reports are to be modified to incorporate bill pay advance functionality according to an embodiment of the invention.

Table F is an example layout of and instructions for a Bill Manager Funding Account Transaction Report according to one embodiment of the invention.

TABLE F

Report #1: BILL MANAGER FUNDING ACCOUNT TRANSACTIONS REPORT

The report contains all successful debits and credits - payments scheduled for that date and successful retries and credits. Report 1 is organized by BPP and has two parts, as do all the Settlement Reports, summary totals, and a detail listing.
Sorting
   1. DDA funding first, then Card funding - subtotal, page break
   2. Debits first, then Credits - subtotal, page break
   3. Bill Payment Processor - subtotal, page break
   4. Debits
      a. Scheduled Payment Date - subtotal, page break
      b. SSN
      c. Funding Account
   5. Credits
      a. Reason category (e.g., Credits: Payment Exceptions, Credits: Returns, etc.) - subtotal, page break
      b. Original Date Sent - subtotal, page break
      c. SSN
      d. Funding Account
Table of Contents
The existing table of contents should be modified to include sections for DDA funding and Card funding. The format for both should be identical.

TABLE F-continued

Report #1: BILL MANAGER FUNDING ACCOUNT TRANSACTIONS REPORT

Report Detail
The fields to be included in the detail are:
   SSN
   Customer Name
   Biller
   Biller ID
   Biller Account
   Payment Amount
   Scheduled Payment Date (for debits only) or Original Date Sent (for credits only)
   Funding Account
   RTN (for DDA transactions only, not Card)
   Number of Tries (for debits only)
The DZ EPAY section shows payments for which DZ has returned a 0000 Completion Code, indicating that the funding account and the payee account passed all edits, so that DZ has sent the debit and the credit (via NMIC) to the WF posting SOR.
Report Summary
The first page of the report contains a summary matrix for each BPP/endpoint with combined totals for DDA funding and then the same matrix for each BPP with combined totals for Card funding.
   DDA Funding
      Rows:
         Debits
         Credits: Returns & Adjustments
         Credits: Payment Exceptions
         Credits: All Other Credit Adj. On Late Hogan NSFs
      Columns:
         Customers
         Accounts
         Transactions
         Total $
   Card Funding
      Rows:
         Debits
         Credits: Returns & Adjustments
         Credits: Payment Exceptions
         Credits: All Other Credit Adj. On Late DZ EPAY
         Note that the three Credits rows will always show all zeros for DZ EPAY, since DZ will never generate a Hogan credit.
      Columns:
         Customers
         Accounts
         Transactions
         Total $ Table G is an example layout of and instructions for a Bill Manager Metavante, relating to a report used to track activity that is conducted by a third party vendor, Metavante Corporation, to effect transactions for a WF ACH Reconciliation Report according to one embodiment of the invention.

TABLE G

Report #4: BILL MANAGER METAVANTE ACH RECONCILIATION REPORT

This report contains all monetary transactions listed in the Metavante Payment History/Exception File. There are 2 files received daily. Each has its own reconciliation report.
Sorting
   1. DDA funding first, then Card funding - subtotal, page break
   2. Debits first, then Credits, then Payments Sent Not Acknowledged - subtotal, page break
   3. Scheduled Payment Date - subtotal, page break
   4. Debits
      a. SSN
      b. Funding Account
   5. Credits
      a. Reason category (e.g., Credits: Payment Exceptions, Credits: Returns, etc.) - subtotal, page break
      b. Original Date Sent - subtotal, page break
      c. SSN
      d. Funding Account

TABLE G-continued

Report #4: BILL MANAGER METAVANTE
ACH RECONCILIATION REPORT

6. Payments Sent Not Acknowledged
        a. SSN
        b. Funding Account
Table of Contents
The existing table of contents should be modified to include sections for
DDA funding and Card funding. The format for both should be identical.
Report Detail
The fields to be included in the detail are:
    SSN
    Customer Name
    Biller
    Biller ID
    Biller Account
    Payment Amount
    Original Date Sent
    Funding Account
    RTN (for DDA transactions only, not Card)
Report Summary
The first page of the report contains a summary matrix for DDA
funding and a summary matrix for Card funding.
    DDA Funding
        Rows:
            Debits
            Debits for Late Hogan NSFs
            Credits: Payment Exceptions
            Credits: Payment Exceptions for Late Hogan NSFs
            Credits: Returns/Adj
            Credits: Return/Adj for Late Hogan NSFs
            Payments Sent, Not Acknowledged
        Columns:
            Customers
            Accounts
            Transactions
            Total $
    Card Funding
        Rows:
            Debits
            Debits for Late DZ EPAY NSFs
            Credits: Payment Exceptions
            Credits: Payment Exceptions for Late DZ EPAY NSFs
            Credits: Returns/Adj
            Credit: Return/Adj for Late DZ EPAY NSFs2
            Payments Sent, Not Acknowledged
        Columns:
            Customers
            Accounts
            Transactions
            Total $

An Exemplary Technical Specification Introduction for Functional Components of Batch Processing Impacted by Card Funding The following sections address the technical specifications for each Functional Area of batch impacted by an exemplary Card Funding project for implementing bill pay advance with card funding according to the invention.

Router

The Payment Router process is responsible for the creation of debit and end-point remittance instructions. When the router batch executes, it uses workflow tables to determine which payment instruction, and payment instruction status to use when creating the instructions for a particular payment. It is based on these payment instructions that payments are debited and remittances sent to the Bill Pay endpoints Bill Pay Card Funding introduces a new payment method Type for executing debit transactions with DZ. It is referred to in this document to as the DZ-CC. This distinguishes the new workflow from the current DZ-EPAY workflow that handles DDA payments to "On-Us" Payees. Payments will be made using supported Credit-Card products to supported payees, which will be processed by the various Remittance processors; MVNT/CF/ECO. These payments will not be sent or processed by the DZ-EPAY process component.

In the case of DDA funding, the Router creates debit and end-point remittance instructions based on the (force-wf-id, pmtsta-id) parameters of a Payment, except in the case of DZ-EPAY where, only one instruction corresponding to an On-Us payment is routed. All pending payments (pmt-sta_id=1, pmt_state=NULL) are updated to debited status (pmtsta_id=101, pmt_state=1) and corresponding instructions are created.

DZCC Payment Outbound

The DZ-CC outbound payment component handles the compiling and sending of debits to DZ. This batch gathers DZ-CC payment data, processes it for errors (duplicates, payment amount, etc.) and formats it into a DZCC debit file. Functionality is split between Java and PL/SQL, with file formatting, handled by Java and DB processing handled by PL/SQL procedures. The shell script handles executing the batch and NDM transport.

ACH OUT

Introduction

Unlike DDA-funded payments, card-funded items returned by the endpoints cannot be automatically credited back to the funding account. Card Services Finance will be responsible for entering cardholder adjustments manually (pending possible future implementation of an automated adjustment capability), including reversing transaction fees and finance charges as appropriate.

The components of the ACH OUT process are:

RouteScheduled—This batch process is a stored procedure that looks for all payments with a start date that is equal to or before today and a payment status of 'Scheduled', and progresses those payments to a payment status of 'In Process'.

RouteAllWFACH—This batch process is a Java program that takes each payment with a status of 'In Process' and creates a payment instruction in the database for the Hogan Debit with an instruction status of 'Open'. If a debit instruction has already been created for this payment, the process does not do anything for that payment. This would occur in the case that a debit instruction was rejected by Hogan in a previous cycle but will get retried again.

GenWFACH—This batch process is a Java program (achout Batchlet) that collects all of the Hogan Debit payment instructions with an instruction status of 'Open', creates an ACH file that will get sent to ODS/PAS and moves all of the instruction statuses for those payments to 'Sent'. There is additional logic in this program which determines if there are any duplicate payments and cancels those duplicates, cancels any payments with amounts that exceed the allowed limit, and batches the payments to similar payees together in the ACH file. This program also collects all of the Hogan Credit payment instructions with a status of 'Open' for inclusion in the file. These credit instructions represent returns, rejects, or adjustments to payments that have been sent to the various end points in prior cycles. Once a credit instruction is included in the file, its status is moved from 'Open' to 'Sent'. This process will be modified to exclude Card Funded credits from being sent to Hogan for processing.

InvokeScheduler—This batch process is the fourth process and is not directly associated with sending the debit instruction to ODS/PAS but occurs in the same workflow cycle. This process looks at all payments with a start date of today and has a recurring payment cycle associated to it, and creates the next future scheduled payment for that recurring cycle. This process is a stored procedure as well.

Batch Processing—Payment Exceptions. Credit card funded payment returns and adjustments should not be automatically sent to hogan by the ACH outbound process, but the payment instruction status should be updated in the same way as the DDA funded payments instruction status.

This will allow these "credits" to be reported (via Settlement Reporting). It is from this reporting that manual processing of account crediting will be done.

DZCC Inbound

Introduction

The DZ-CC inbound payment status component handles parsing the payment status file sent from DZ-CC to BillPay and updating BillPay payment information accordingly. The procedure parses the DZCC status file, processes the rejects, and sends error alerts to customers.

Inputs and Outputs

The only inputs and outputs for the Card Funding DZ-CC implementation are flat files that are exchanged between BillPay and DZ-CC. There is a flat file sent from BillPay to DZ-CC that contains all payment information, and there is a flat file sent from DZ-CC to BillPay that contains processing status for those payments.

A file will be sent to DZ for each processing period. In response, DZ will send a file with statuses to BillPay. The status file will include a response only for the payments that were rejected by DZCC. The records in both files need not be ordered in any way for DZCC or BME to be able to process them.

ODS/PAS Xref Functional Specifications

The purpose of the existing ODS/PAS Xref batch is to query information pertaining to the current BP active members and their DDA accounts (SSN, DDA account number, member status, member id, brand id) from the BP database and send these data in an outbound cross reference file to ODS/PAS (Hogan). This file is used by ODS/PAS to update other Wells Fargo system, such as CIS and STS, so that the Bill Pay customer information is synchronized with the Hogan information. This batch runs every day at 18:00 (6 PM), from Monday to Friday, except business holidays.

ODS/PAS Xref Steps Affected by Credit Card Funding Logic Walk Through:

TABLE H

| Steps | Descriptions | Layers |
|---|---|---|
| . | . | . |
| . | . | . |
| . | . | . |
| 9–12 | The stored procedure P_XREF_PKG.P_XREF queries the database for all active Bill Pay members' SSNs and their valid payment method account numbers.<br>For Credit Card Funding project, the stored procedure needs to be enhanced with an additional filtering condition ("where" clause) to only query for DDA checking accounts (Payment Method Type ID is 0).<br>The stored procedure returns a record for each SSN-Account Number pair consisting of the following cross reference information for each record:<br>    1) SSN<br>    2) Account Numbers (only DDA checking) associated with the above SSN.<br>        The previous code that checks if PM_ACCOUNT_NO value is NULL and assign the value "0114DDA0000000000" will be removed since currently there is a NOT NULL constraint on this field.<br>    3) Member Status associated with the above SSN. The value of this field is assigned by the logic described in Table 1: ODS/PAS Xref Member Status States, in Appendix 4.1<br>    4) Member ID associated with the above SSN<br>    1) Brand ID associated with the above SSN | PL/SQL |
| . | . | . |
| . | . | . |
| . | . | . |
| 15 | The shell script checks if the batchlet execution return status is "0" for success | Shell script |
| 16–17 | If the batchlet return status is "53", which means that there are records rejected by the batchlet and not outputted, the shell script logs a failure message in the payflow.log and continue to NDM the outbound xref file to endpoint. | Shell script |
| 18 | If the batchlet return status is not "53" or "0", the shell script logs a failure message in the payflow.log and terminate execution at this point. | Shell script |
| 19 | If the batchlet return status is "0" for success, the shell script logs a success message in the payflow.log. | |
| 20–21 | The shell script now checks if the current time is after 23:30. If before, it NDMs the xref.out file to Hogan,. If the equal or after, something must have gone wrong, and the outbound file is not NDM. The ODS/PAS Xref batch process ends after this. | Shell script |

Stored Procedures

The PL/SQL stored procedure handles all database logic for querying the necessary cross-reference information to output to the output file. The PL/SQL stored procedure for the ODS/PAS Xref batch resides within the package P_XREF_PKG.

For Credit Card Funding project, the stored procedure for the ODS/PAS Xref batch must add logic to filter out credit card accounts and only return DDA accounts from the query (CBPAYMENT_METHOD.PMTYP_ID equals 0).

Additionally, the PUSQL package P_COMMON_CONST_PKG will also need to be modified with additional constants for the PMTYP_ID values. These constants will be used by the P_XREF stored procedure to implement the filters stated above.

FF Xref Functional Specifications

The purpose of the existing Billing Xref batch is to query information pertaining to the current BP active members and their DDA default fee funding accounts (SSN, DDA account number, member status, member id, brand id) from the BP database and send this information in an outbound cross reference file to ODS/PAS, similar to the ODS/PAS Xref batch. This batch is executed on the 2nd, 7th, and 17th business day of each month, starting at 2:00 AM. On these business days, ODS/PAS will use the cross reference information to send back combined balance files containing the combined balance of the accounts of each active BP member, which will be processed by the Combined Balance batch. Also, on the 17th business day, ODS/PAS will send back a VIP/EMP file containing the flags indicating whether an active BP customer should be waived as a VIP or WF employee customer, which will be processed by the VIP/Emp batch.

In high level, the changes made to the FF Xref batch to accommodate the Credit Card Fundng project that differs from the ODS/PAS Xref includes:
  New crontab entry to execute the FF Xref batch
  Reuse the same Xref batchlet:
    Need to pass in flags from the shell script
    Add switch logic in the Batchlet code to reads this flag to determine whether to execute ODS/PAS Xref, Billing Xref, or FF Xref logic
    If executing in FF Xref mode, write logs into a new log4j file by using the /config/fflog4j.xml file.
  Reuse the same P_XREF_PKG.P_XREF stored procedure as ODS/PAS Xref.
    Add a switch to filter out DDA accounts and return only credit accounts if executing in FF Xref mode.

Xref Step-By-Step Logic Walk Through

TABLE I

| Steps | Descriptions | Layers |
|---|---|---|
| 0 | Crontab entry calls the FF Xref shell script, ffxref, at 18:00 (Mon–Fri) | Crontab |
| 1 | The ffxref shell script checks if today's date is a business holiday.<br>If today is a holiday, the FF Xref batch process is terminated.<br>If today is not a holiday, then . . . | Shell script |
| 2 | The shell script archives the previous/opt/bpdata/ff/outbound/FFXref.out outbound file, and it then execute the FF Xref Batchlet | Shell script |
| 3 | The batchlet checks the "XREF_FLAG_PARAM" variable.<br>If the variable is assigned "Billing", the logic for Billing Xref process is executed.<br>Otherwise, . . . | Batch Frame work |
| 4 | The batchlet checks the "XREF_FLAG_PARAM" variable.<br>If the variable is assigned "FF", the logic for FF Xref process is executed.<br>If the variable is not provided, then the logic for the ODS/PAS Xref process is executed. | Batch Frame work |
| 5 | The batchlet processes the file configuration for the FF Xref. The backend processing logic for this step is transparent to this batchlet and is handled by the Batch Framework support classes. | Batch Frame work |
| . . . | . . . | . |
| 9–12 | The stored procedure P_XREF_PKG.P_XREF queries the database for all active Bill Pay members' SSNs and their valid payment method account numbers.<br>For Credit Card Funding project, the stored procedure will only query for credit accounts and filters out the DDA accounts.<br>The stored procedure returns a record for each SSN-Account Number pair consisting of the following cross reference information for each record:<br>  1) SSN<br>  2) Account Numbers (only credit acct.) associated with the above SSN.<br>  3) Member Status associated with the above SSN. The value of this field is assigned by the logic described in Table 1: FF Xref Member Status States, in Appendix 4.1<br>  4) Member ID associated with the above SSN<br>  5) Brand ID associated with the above SSN | PL/SQL |
| . . . | . . . | . |
| 15 | The shell script checks if the batchlet execution return status is "0" for success | Shell |

TABLE I-continued

| Steps | Descriptions | Layers |
|---|---|---|
| 16–17 | If the batchlet return status is "53", which means that there are records rejected by the batchlet and not outputted, the shell script logs a failure message in the payflow.log and continue to NDM the outbound xref file to endpoint. | Shell script |
| 18 | If the batchlet return status is not "53" or "0", the shell script logs a failure message in the payflow.log and terminate execution at this point. | Shell script |
| 19 | If the batchlet return status is "0" for success, the shell script logs a success message in the payflow.log. | |
| 20–21 | The shell script now checks if the current time is after 23:30. If before, it NDMs the FFXref.out file to FF (FDR). If the equal or after, something must have gone wrong, and the outbound file is not transmitted.<br>The FF Xref batch process ends after this. | Shell script |

FF Transfer Functional Specifications

The processing logic of the existing ODS/PAS Transfer batch and the FF Transfer batch are very similar. A design decision has been made to reuse majority of the existing implementation and components of the ODS/PAS Transfer batch to develop the new FF Transfer batch. The FF Transfer batch, will require a new crontab entry, but only minimal logic changes will be made to the existing shell script and java batchlet code. No changes are required to the existing PL/SQL stored procedure.

Additionally, the Transfer batch and the Closure batch both share the same shell script. This section of the document will not contain details of the Closure batch.

The design of the FF Transfer batch will be broken into four main components, which are composed of:

Crontab entry

Unix shell script

Batchlet and its corresponding support Java classes

PL/SQL package and stored procedure.

The following activity diagram depicts the sub-portion of the logical interactions of the FF Transfer batch that differs between the existing ODS/PAS Transfer batch for the Credit Card Funding project.

FF Transfer Step-By-Step Logic Walk Through:

TABLE J

| Steps | Descriptions | Layers |
|---|---|---|
| 0 | For FF Transfer batch, crontab entry calls the Transfer and Closure shell script, closeandtransfer, at 5:30 AM (Tues–Sat). An input parameter "–f" is passed into the shell script to signal the Transfer batch process to execute the FF Transfer batch logic. | Crontab |
| 1 | The shell script checks if today's date is a business holiday. If today is a holiday, the Transfer batch process is terminated. If today is not a holiday, then . . . | Shell script |
| 2 | The Transfer batch will loop and check every 10 minutes from the current time until 10:30 AM for FF Transfer batch whether the inbound transfer file has arrived through NDM. The shell script first calculates the loop counter that the batch needs to check for the incoming file. | Shell script |
| Loop | Based on the counter calculated in step 2, the batch loops through this counter. | Shell script |
| 3 | The program checks if the transfer file has arrived from endpoint. If the transfer file has not arrived, skip to step 4. If the transfer file has arrived, the program logs a success message in the payflow.log and executes the Transfer batchlet. Skip to step 5. | Shell script |
| 4 | The program checks if the process has iterate past the loop counter. If the loop counter has not been passed, the next iteration starts again after 10 minutes of wait time. If the loop counter has been passed, the program logs a failure message in payflow.log and terminates the batch process. The program ends here. | Shell script |
| 5 | The Transfer batchlet first obtain the FF file configuration to parse the inbound file. | Batch Frame work |
| 6 | The batchlet also gets the system ID value stored in the batch-config.xml file. NOTE: A new ffSystemId = 71 is being added for the FE Transfer batch. | Batch Frame work |
| 7 | The batchlet prepares the ParserInput object to parse the inbound file, using the file configuration obtained above. | Batch Frame work |
| 8 | The batchlet prepares all the SQL wrapper objects and setting the system ID in these objects where necessary | Batch Frame work |

TABLE J-continued

| Steps | Descriptions | Layers |
|---|---|---|
| Loop | The batchlet parses the inbound file and loops through each transfer record. | Batch Frame work |
| 9 | The batchlet gets the old acct#, new acc#, and ssn for this record being iterated from the FF Transfer inbound file. | Batch Frame work |
| 10 | The batchlet gets the payment methods associated with the ssn and old acct# obtained above from the CBPAYMENT_METHOD and CBMEMBER tables:<br>    Old Payment Method ID (old pmID)<br>    Member ID (memID)<br>    New Payment Method ID (new pmID)<br>    Payment Method Default Flag (pmDefault flag)<br>    New Balance ID (new balance ID)<br>The payment method nick name (pmName) and new account code is also calculated by the batchlet from the database values obtained. | Batch Frame work |
| Loop | The batchlet loops through the row(s) of keys obtained above | Batch Frame work |
| 11 | The batchlet gets the keys' values for this record being iterated | Batch Frame work |
| 12–14 | The batchlet inserts a new payment method into the CBPAYMENT_METHOD table for this transfer record being iterated, based on the new pmID, pmName, new acct#, old pmID, new acct_code and memID information obtained previously.<br>In the case of inserting a new payment method, the value of the pm_sub_prod_code database field will be copied from the old account and inserted into the new payment method.<br>If the pmDefault flag of the transferred account is equal to "1" (meaning this account is a default fee funding account), then the batchlet also updates the default fee funding account number to the new transferred account in the CBMEMBER table. | Batch Frame work |
| 15–16 SQLException | If a SQLException occurs during steps 12–14 above, the batchlet uses the ssn and new acct# values to obtains a new pmID from the CBPAYMENT_METHOD.<br>In case there is an existing payment method with the same new acct# in the DB, the batchlet sets the status of the new pmID obtained in the previous sentence to "APPROVED" and updates its pmDefault flag and new acct_code accordingly. No action will be taken on the pm_sub_prod_code when transferring to an existing payment method. | Batch Frame work |

ODS/PAS Closure Migration & FF Closure Functional Specification
Change Component—Closure Batchlet Migration:
  The script in the cron directory will now call the new batchlet rather than the NetDynamic module.
  The original logic has a check that sends out alerts and notices if a customer has a valid email. So the customer either receives both the alert and the notice, or nothing at all. For each closure record, modification has been made so that both alert and notice records would always be created because email is now a required field in the Bill Pay UI and database.
Change Component—FF Closure:
  A new inbound FFClosure.in file will be sent from FF (FDR), the format is different than the ODS/PAS Closure inbound file in that the CC account number is 23 characters in length as opposed to 17 characters for a DDA account.
  A new filespec ffclosure-file-spec.xml is defined for the batchlet layer to use for FF Closure.
  Same batchlet process would be used, with a configuration switch to specify that the FF filespec needs to be used for FF Closure situation.
  The same shell script will be used, but with a configuration paramater passed in from a new closureandtransfer cron entry (for FF scenario). The configuration parameter is passed into the execution of the Closure batchlet to set an option parameter so that the batchlet can choose between FF Closure or ODS Closure logic.
  Based on the shell parameter, different NDM calls are used to get the FFClosure.in or Closure.in files.
  The shell script will also write a different successful/failure alarm messages into the payflow.log file for the FF Closure (versus ODS/PAS Closure) batch.
Introduction
  The ODS/PAS Closure batch's job is to process the inbound closure file, where each line of record contains an SSN of a Bill Pay customer and an associated payment method that needs to be closed. For each line of record in the file, the batch will close the payment method, and cancel any payments (including automatic and recurring) that is linked to the closed account.
  The new account closure batch program composes of one Java batchlet class, supporting classes, and PL/SQL procedures. The Java classes handle parsing the input files, and process the data via SQL and PUSQL. The program gathers DB information, processes the data, and then updates payment method and payment related tables with new statuses and creates new alerts.
Billing Xref Functional Specification
  In high level, the changes made to the Billing Xref batch to accommodate the Credit Card Funding project includes:

Convert and invoke the migrated code using the Batch Framework platform. No longer use the existing Neydynamics code.

The Xref batchlet will log into the batchlet execution information to the same log file as in NetDynamics environment/opt/bpdata/billing/xref/writeBillingCRF.log file Adding a filtering condition to the P_XREF_PKG.P_PRICING_XREF stored procedure to filter out credit accounts and return only DDA accounts.

Change the select statement of the P_XREF_PKG.P_PRICING_XREF stored procedure to use SYSDATE, instead of P_WFSYSDATE.

Billing Xref Steps Affected by Credit Card Funding Logic Walk Through:

TABLE K

| Steps | Descriptions | Layers |
|---|---|---|
| . . . | . . . | . . . |
| 10–11 | The stored procedure P_XREF_PKG.P_PRICING_XREF queries the database for all active Bill Pay members' SSNs and their valid payment method account numbers. For Credit Card Funding project, the stored procedure needs to be enhanced with an additional filtering condition ("where" clause) to only query for DDA accounts (Payment Method Type ID is 0). The stored procedure returns a record for each SSN-Account Number pair consisting of the following cross reference information for each record: 1. SSN 2. Account Numbers (only DDA) associated with the above SSN 3. Member Status associated with the above SSN. The value of this field is assigned by the logic described in Table 2: Billing Xref Member Status States, in Appendix 4.2 4. Member ID associated with the above SSN 1. Brand ID associated with the above SSN | PL/SQL |
| . . . | . . . | . . . |
| 14 | The shell script checks if the batchlet execution return status is "0" for success | Shell script |
| 15–16 | If the batchlet return status is "53", which means that there are records rejected by the batchlet and not outputted, the shell script logs a failure message in the payflow.log and continue to NDM the outbound xref file to endpoint. | Shell script |
| 17 | If the batchlet return status is not "53" or "0", the shell script logs a failure message in the payflow.log and terminate execution at this point. | Shell script |
| 18 | If the batchlet return status is "0" for success, the shell script logs a success message in the payflow.log. | |
| 19–20 | The shell script now checks if the current time is after 4:50. If before, it NDMs the xref.out file to Hogan,. If the equal or after, something must have gone wrong, and the outbound file is not NDM. The Billing Xref batch process ends after this. | Shell script |

GetPM
Design
Filtering the Credit-Card Payment Methods.

The current GetPM batchlet process assigns a Service Fee account if the customer does not specify a default Funding/Service Fee Account within 45 days of enrolling in Bill Pay. An eligible checking account is systematically assigned. The get_pm (get payment method) process will be modified to allow only checking accounts to be assigned as the default Funding/Service Fee account. The update (SQL script) process will implement this business rule.

Note: While there are changes to the Gateway.jar to avoid de-linking account information, the APS Service interface will remain the same for the getPM component, requiring no changes to the getPM code. The change is to the Gateway jar file it references.

Ineligible Payees
Overview

The ineligible_merchant package contains the functions used for canceling and suspending payments scheduled with Credit Card Funding accounts to payees that are ineligible for payment from these accounts. The package contains two low-level procedures: cancel_one_payment and suspend_one_payment, and two high-level procedures: cancel_all_payments and suspend_all_payments. The high-level procedures will be used when a new merchant is added to the ineligible merchant list and will be scheduled weekly as a batch process (schedule TBD).

Data Mart Extract
Introduction

The purpose of the existing DataMart (Monthly/Weekly) process is to retrieve information pertaining to DDA accounts from the Bill Pay database and send this information as flat files to the DataMart system.

Data Mart Monthly/Weekly Scripts Design Overview

DataMart Scripts (both Monthly and Weekly) runs from the crontab, extracts data from Bill Pay database on monthly and weekly basis respectively and generates flat files to be sent to DataMart on monthly and weekly basis. These flat files are tab-delimited and are not fixed character position files.

The purpose of the existing DataMart (Monthly/Weekly) scripts were to query information from the Bill Pay database and send these data as flat files to DataMart. These flat files were used by DataMart to load their database. The DataMart monthly script (datamart_monthly.ksh) runs from crontab on 4th calendar day of every month at 08:00 am PST. This wrapper script calls several sql scripts to generate monthly flat files. And the DataMart weekly script (datamart_weekly.ksh) runs from crontab on every Monday at 01:00 am PST and calls several sql scripts to generate weekly flat files.

To accommodate the requirements of the Credit Card Funding project, the existing DataMart Scripts will require additional changes to allow it to include card funding transactions along with DDA transactions and also to include sub-product code information along with funding account number, since it currently does not contain any logic to include sub-product code information. This requires addition of new column sub-product code in the DataMart tables.

Settlement Reports

The purpose of this document is to provide the requirements for new or revised Bill Pay Settlement Reports for the Bill Pay Card Funding project. This document describes the changes that Bill Pay needs to implement on the existing settlement reports' stored programs and on tables that these programs.

the summary tables at the beginning of each report to include subtotals by funding account type (i.e., DDA and Card).

Focused on customer funding accounts:
  BMRpt01—Bill Pay Funding Account Transactions Report
  BMRpt02—Bill Pay Funding Account Rejects Report
  BMRpt03—Bill Pay Late Funding Account Rejects Report
  BMRpt05—Bill Pay All Transactions Report
  BMRpt06—Bill Pay System Cancelled Payments Report
Focused on Bill Pay Processors (BPPs):
  BMRpt04—Bill Pay Metavante ACH Reconciliation Report (2 reports)
  BMRpt07—Bill Pay Remittance for Processors Sent and Unsent Report
  BMRpt08—Bill Pay ECO Reconciliation Report (3 reports)
  BMRpt09—Bill Pay Metavante Sponsor Settlement File Report
  BMRpt10—Bill Pay CheckFree Reconciliation Report (2 reports)
  BMRpt11—Bill Pay DZ EPAY Reconciliation Report The Bill Pay Settlement Reports, their associated reporting tables, and proposed new report names are listed in the following table.

TABLE L

| Report | Current Report Name | New Report Name | Bill Pay's Reporting Table |
|---|---|---|---|
| BMRPT01 | Hogan Transaction Report | Funding Account Transactions Report | WFRPT_HOGAN_DEBITS |
| BMRPT02 | Hogan Rejects Report | Funding Account Rejects Report | WFRPT_HOGAN_REJECTS |
| BMRPT03 | Late Hogan Rejects Report | Late Funding Account Rejects Report | WFRPT_LATE_REJECTS |
| BMRPT04 | Metavante ACH Reconciliation Report | Metavante ACH Reconciliation Report | WFRPT_PMT_RECON |
| BMRPT05 | All Transactions Report | All Transactions Report | WFRPT_SCHEDULED_PMTS |
| BMRPT06 | System Cancelled Payments Report | System Cancelled Payments Report | WFRPT_UNPROCESSED_PMTS |
| BMRPT07 | Remittance For Processors Sent And Unsent Report | Remittance For Processors Sent And Unsent Report | WFRPT_PMT_TO_REMIT |
| BMRPT08 | ECO Reconciliation Report | ECO Reconciliation Report | WFRPT_ECO_RECON |
| BMRPT09 | Metavante Sponsor Settlement File Report | Metavante Sponsor Settlement File Report | WFRPT_MVNT_SETTLEMNT |
| BMRPT10 | Checkfree Reconciliation Report | Checkfree Reconciliation Report | WFRPT_CF_SETTLEMENT (For AM report only) WFRPT_PMT_RECON (AM & PM) |
| BMRPT11 | DZ EPAY Reconciliation Report | DZ EPAY Reconciliation Report | WFRPT_PMT_RECON |

Bill Pay Environment

Existing settlement reports are focused on customer deposit accounts or on Bill Pay Processors.
  Focused on customer DDAs:
    BMRpt01—Bill Pay Hogan Transactions Report
    BMRpt02—Bill Pay Hogan Rejects Report
    BMRpt03—Bill Pay Late Hogan Rejects Report
    BMRpt05—Bill Pay All Transactions Report
    BMRpt06—System Cancelled Payments Report
  Focused on Bill Pay Processors (BPPs):
    BMRpt04—Bill Pay: Metavante ACH Reconciliation Report
    BMRpt07—Remittance for Processors Sent and Unsent Report
    BMRpt08—Bill Pay ECO Reconciliation Report
    BMRpt09—Bill Pay: Metavante Sponsor Settlement File Report
    BMRpt10—Bill Pay: CheckFree Reconciliation Report
    BMRpt11—Bill Pay DZ EPAY Reconciliation Report
Proposed Bill Pay Advance Environment
  Add card-funded transactions to the existing settlement reports and rename them to reflect the new content. Expand Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. Non-transitory computer-readable media having stored therein instructions that when executed cause a computer to implement a process for a non-interchange bill pay advance transaction by a bill pay service, the process comprising:
  receiving payment instructions from a customer specifying a credit card account as a source of funds, the credit card account being provided by an issuer that is affiliated with the bill pay service, the payment instructions being received using an user interface that is accessible to the customer by way of the Internet, the user interface being implemented by the instructions stored in the computer-readable media;
  responsive to receiving the payment instructions, using funding logic to request the funds from the issuer of the credit card via an internal funds transfer from the issuer to the affiliated bill pay service, and wherein the funds are requested such that the funds are treated by a card association set of rules as a cash advance and not as a payment to a merchant, the card association set of rules being rules that merchants must follow in order to accept the credit card, the funding logic being implemented by the instructions stored in the computer-readable media;

receiving the funds from the issuer of the credit card; sending the received funds to a payee, wherein no interchange fee is paid in connection with the received funds, and wherein the bill pay service is configured to send the received funds to the payee regardless whether the payee accepts credit card payments; storing a record of the payment in a database; and generating a transaction description for the non-interchange bill pay advance transaction on a credit card statement, wherein the non-interchange bill pay advance transaction is shown in the transaction description as a cash advance and not as a payment to a merchant.

2. The non-transitory computer-readable media of claim 1, wherein the process further comprises the steps of:

responsive to the sending of the funds, the bill pay service making certain restrictions prohibiting funds to be sent to certain payees and/or in certain amounts;

the affiliated credit card issuer providing the cash advance as requested; and wherein the affiliated credit card issuer follows rules of any of: a credit card association and credit card servicing companies to which it is affiliated.

3. The non-transitory computer-readable media of claim 1, wherein the process further comprises the steps of:

specifying advance payment from other bill pay service acceptable sources as a source of funds; and obtaining funds from the other bill pay service acceptable sources of funds.

4. The non-transitory computer-readable media of claim 1, wherein the payment instructions are made by multiple customers.

5. The non-transitory computer-readable media of claim 1, wherein the payee is not required to perform any of the following:

accept a credit card;
accept email;
open any type of account:
make contact with at least one of: the bill pay service and the customer; and
accept any form of credit.

6. The non-transitory computer-readable media of claim 1, wherein receiving the payment instructions comprises receiving at least one of: amount of funds, date of payment to the payee, form of payment to the payee.

7. The non-transitory computer-readable media of claim 1, wherein the form of payment to the payee is a paper check.

8. The non-transitory computer-readable media of claim 1, wherein the form of payment to the payee is electronic payment.

9. The non-transitory computer-readable media of claim 1, wherein the form of payment is through a third party service.

10. The non-transitory computer-readable media of claim 1, wherein the process further comprises receiving a plurality of payment instructions for a plurality of payees.

11. The non-transitory computer-readable media claim 1, wherein the payee is not required to accept e-mail to receive the funds.

12. The non-transitory computer-readable media claim 1, wherein the payee does not have an account with the bill pay service.

13. Non-transitory computer-readable media having stored therein instructions that when executed cause a computer to implement a process for a bill pay advance transaction by a bill pay service, the process comprising:

receiving payment instructions from a customer to pay a payee using from a credit card account as a source of funds, the credit card account being provided by an issuer that is affiliated with the bill pay service, the payment instructions being received using an user interface that is accessible to the customer by way of the Internet, the user interface being implemented by the instructions stored in the computer-readable media;

responsive to the customer instructing, using funding logic to request the funds from the issuer of the credit card via an internal funds transfer from the issuer to the affiliated bill pay service, wherein the funds are requested such that the funds are treated by a card association set of rules as a cash advance and not as a payment to a merchant, the card association set of rules being rules that merchants must follow in order to accept the credit card, the funding logic being implemented by the instructions stored in the computer-readable media;

receiving the funds associated with the cash advance into one or more designated accounts in the bill pay system;

forwarding the received funds and instructing a bill pay processor to remit funds to a payee without the payee incurring an interchange fee, and wherein the bill pay service is configured to send the received funds to the payee regardless whether the payee accepts credit card payments;

storing a record of the payment in a database; and generating a transaction description for the non-interchange bill pay advance transaction on a credit card statement, wherein the non-interchange bill pay advance transaction is shown in the transaction description as a cash advance and not as a payment to a merchant.

14. The non-transitory computer-readable media of claim 13, wherein the one or more designated accounts comprise at least one of a suspense account or a settlement account.

15. The non-transitory computer-readable media of claim 13, wherein the bill pay service is additionally funded by at least one of a direct deposit account, a savings account, debit cards and brokerage accounts.

16. The non-transitory computer-readable media of claim 13, wherein the bill pay service instructs a processor of the credit card to exchange customer credit card information with a card association network for at least one of: informational, authorization, and statement purposes.

17. The non-transitory computer-readable media of claim 13, wherein the bill pay service is used to pay an invoice that the payee sent to the customer.

18. The non-transitory computer-readable media of claim 13, wherein the bill pay service will make a payment of a specified amount to a payee periodically.

19. The non-transitory computer-readable media of claim 13, wherein the process further comprises the step of: the customer remitting payments comprising credit card bill payments, credit card interest, and fees to the credit card system.

20. Non-transitory computer-readable media having stored therein instructions that when executed cause a computer to implement a process for a non-interchange bill pay advance transaction by a bill pay service, the process comprising:

receiving payment instructions from a customer specifying a credit card account as a source of funds, the credit card account being provided by an issuer that is affiliated with the bill pay service, the payment instructions being received using an user interface that is accessible to the customer by way of the Internet, the user interface being implemented by the instructions stored in the computer-readable media;

responsive to receiving the payment instructions, using funding logic to request the funds from the issuer of the credit card via an internal funds transfer from the issuer to the affiliated bill pay service, and wherein the funds are requested such that the funds are treated by a card association set of rules as a cash advance and not as a payment to a merchant, the card association set of rules being rules that merchants must follow in order to accept the credit card, the funding logic being implemented by the instructions stored in the computer-readable media;

receiving the funds from the issuer of the credit card;

sending the received funds to a payee, wherein no interchange fee is paid in connection with the received funds, wherein the payee does not accept credit card payments, wherein the form of payment to the payee is a paper check, wherein the payee is not required to accept e-mail to receive the funds, and wherein the payee is not required to have an account with the bill pay service to receive the funds;

storing a record of the payment in a database; and generating a transaction description for the non-interchange bill pay advance transaction on a credit card statement, wherein the non-interchange bill pay advance transaction is shown in the transaction description as a cash advance and not as a payment to a merchant.

* * * * *